US012657919B2

(12) United States Patent　　　　　(10) Patent No.: US 12,657,919 B2
Yamamoto et al.　　　　　　　　　(45) Date of Patent: Jun. 16, 2026

(54) NON-TRANSITORY COMPUTER-READABLE RECORDING MEDIUM, INFORMATION PROCESSING METHOD, AND INFORMATION PROCESSING APPARATUS

(71) Applicant: FUJITSU LIMITED, Kawasaki (JP)

(72) Inventors: Takuma Yamamoto, Yokohama (JP); Yuya Obinata, Kawasaki (JP); Osafumi Nakayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 746 days.

(21) Appl. No.: 17/946,468

(22) Filed: Sep. 16, 2022

(65) Prior Publication Data

US 2023/0206639 A1　　Jun. 29, 2023

(30) Foreign Application Priority Data

Dec. 28, 2021　(JP) ................................. 2021-215276

(51) Int. Cl.
　　*G06V 20/52*　　(2022.01)
　　*G06V 10/40*　　(2022.01)
　　(Continued)

(52) U.S. Cl.
　　CPC .............. *G06V 20/52* (2022.01); *G06V 10/40* (2022.01); *G06V 10/751* (2022.01); (Continued)

(58) Field of Classification Search
　　None
　　See application file for complete search history.

(56) References Cited

U.S. PATENT DOCUMENTS

RE43,147 E * 1/2012 Aviv ................ G08B 13/19613
　　　　　　　　　　　　　　　　348/143
8,219,438 B1 * 7/2012 Moon ................ G06Q 30/0204
　　　　　　　　　　　　　　　　705/7.29
(Continued)

FOREIGN PATENT DOCUMENTS

CN　　　111476202　　　7/2020
JP　　　2020-071665 A　　5/2020
(Continued)

OTHER PUBLICATIONS

Extended European Search Report dated Mar. 22, 2023 for corresponding European Patent Application No. 22195572.7, 10 pages.
(Continued)

*Primary Examiner* — Chan S Park
(74) *Attorney, Agent, or Firm* — Fujitsu Intellectual Property Center

(57) ABSTRACT

An information processing apparatus acquires video image data that includes target objects including a person and an object, and specifies, by using graph data that indicates a relationship between each of target objects stored in a storage unit, a relationship between each of the target objects included in the acquired video image data. The information processing apparatus specifies, by using a feature value of the person included in the acquired video image data, a behavior of the person included in the video image data. The information processing apparatus predicts, by inputting the specified behavior of the person and the specified relationship to a probability model, a future behavior or a future state of the person.

17 Claims, 25 Drawing Sheets

(51) Int. Cl.

| | |
|---|---|
| *G06V 10/75* | (2022.01) |
| *G06V 10/776* | (2022.01) |
| *G06V 10/82* | (2022.01) |
| *G06V 10/86* | (2022.01) |
| *G06V 20/40* | (2022.01) |
| *G06V 40/16* | (2022.01) |
| *G06V 40/20* | (2022.01) |

(52) U.S. Cl.
CPC ............ *G06V 10/776* (2022.01); *G06V 10/82* (2022.01); *G06V 10/86* (2022.01); *G06V 20/41* (2022.01); *G06V 40/174* (2022.01); *G06V 40/20* (2022.01)

(56) References Cited

U.S. PATENT DOCUMENTS

| | | | |
|---|---|---|---|
| 11,354,901 B2* | 6/2022 | Cao ........................... | G06T 7/74 |
| 2020/0151585 A1 | 5/2020 | Ishida | |
| 2020/0188736 A1 | 6/2020 | Naito et al. | |
| 2021/0004621 A1* | 1/2021 | Nakai ................... | G06V 40/70 |
| 2021/0012216 A1 | 1/2021 | Giovannini et al. | |
| 2021/0216821 A1 | 7/2021 | Uchida et al. | |
| 2023/0051467 A1* | 2/2023 | Dang ................... | G06V 10/778 |
| 2023/0177799 A1* | 6/2023 | Griffin ................... | G06F 18/22 |
| | | | 382/159 |

FOREIGN PATENT DOCUMENTS

| | | | |
|---|---|---|---|
| JP | 20200077343 A | 5/2020 | |
| JP | 2021-111114 A | 8/2021 | |
| WO | 2019/049216 A1 | 3/2019 | |
| WO | 2021/046412 A1 | 3/2021 | |

OTHER PUBLICATIONS

Zhao, He et al., "Review of Video Predictive Understanding: Early Action Recognition and Future Action Prediction", Published Jul. 11, 2021, arxiv.org, Cornell University Library, XP091010820, pp. 1-63.

JPOA—Japanese Office Action mailed Jun. 10, 2025 for Japanese Patent Application No. 2021-215276, with English translation (6 pages).

JPOA—Office Action of Japanese Patent Application No. 2021-215276 dated Dec. 2, 2025, with English translation (11 pages).

* cited by examiner

FIG.2

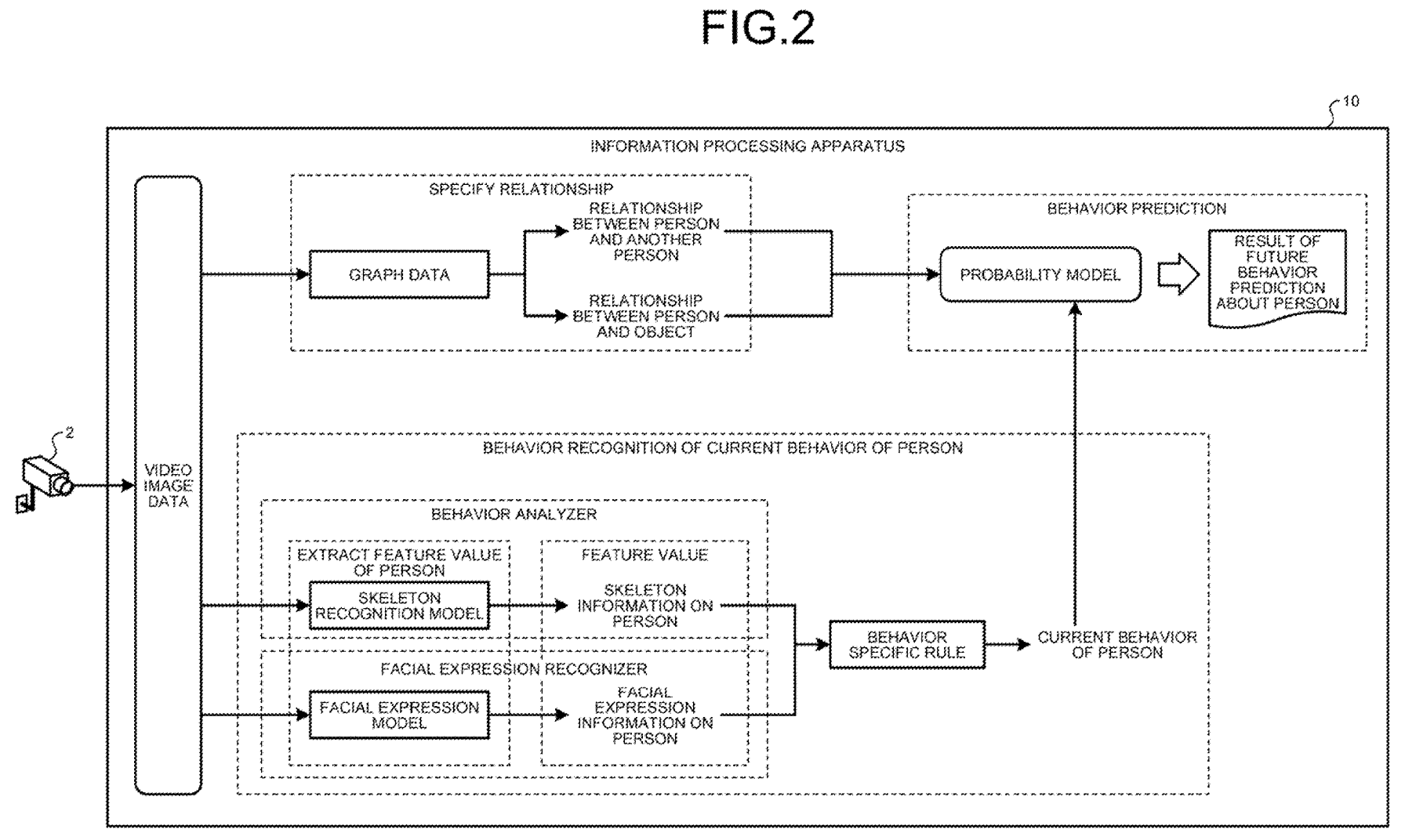

INFORMATION PROCESSING APPARATUS

BEHAVIOR PREDICTION

RESULT OF FUTURE BEHAVIOR PREDICTION ABOUT PERSON

PROBABILITY MODEL

SPECIFY RELATIONSHIP

RELATIONSHIP BETWEEN PERSON AND ANOTHER PERSON

RELATIONSHIP BETWEEN PERSON AND OBJECT

GRAPH DATA

BEHAVIOR RECOGNITION OF CURRENT BEHAVIOR OF PERSON

CURRENT BEHAVIOR OF PERSON

BEHAVIOR SPECIFIC RULE

BEHAVIOR ANALYZER

FEATURE VALUE

SKELETON INFORMATION ON PERSON

FACIAL EXPRESSION INFORMATION ON PERSON

FACIAL EXPRESSION RECOGNIZER

EXTRACT FEATURE VALUE OF PERSON

SKELETON RECOGNITION MODEL

FACIAL EXPRESSION MODEL

VIDEO IMAGE DATA

FIG.3

| | AFTER FEW SECONDS TO FEW MINUTES | TO AFTER FEW HOURS | TO AFTER FEW DAYS | LONG TERM TO AFTER FEW MONTHS |
|---|---|---|---|---|
| USE CASE | ·HUMAN SUPPORT BY ROBOT<br>·ONLINE COMMUNICATION SUPPORT | ·PURCHASE BEHAVIOR IN STORE<br>·SHOPLIFTING (CRIME)<br>·SUICIDE | ·POLICE BOX ATTACK<br>·DOMESTIC VIOLENCE | ·IMPROVEMENT IN GRADE OF STUDY<br>·ALZHEIMER (PREDICTION OF DISEASE) |

FIG.6

| FACIAL EXPRESSION | ESTIMATION RESULT |
|---|---|
| SMILE | AU1:2, AU2:5, AU3:0, ⋯ |
| ANGRY FACE | AU1:5, AU2:3, AU3:1, ⋯ |
| ⋯ | ⋯ |

Figure 17:
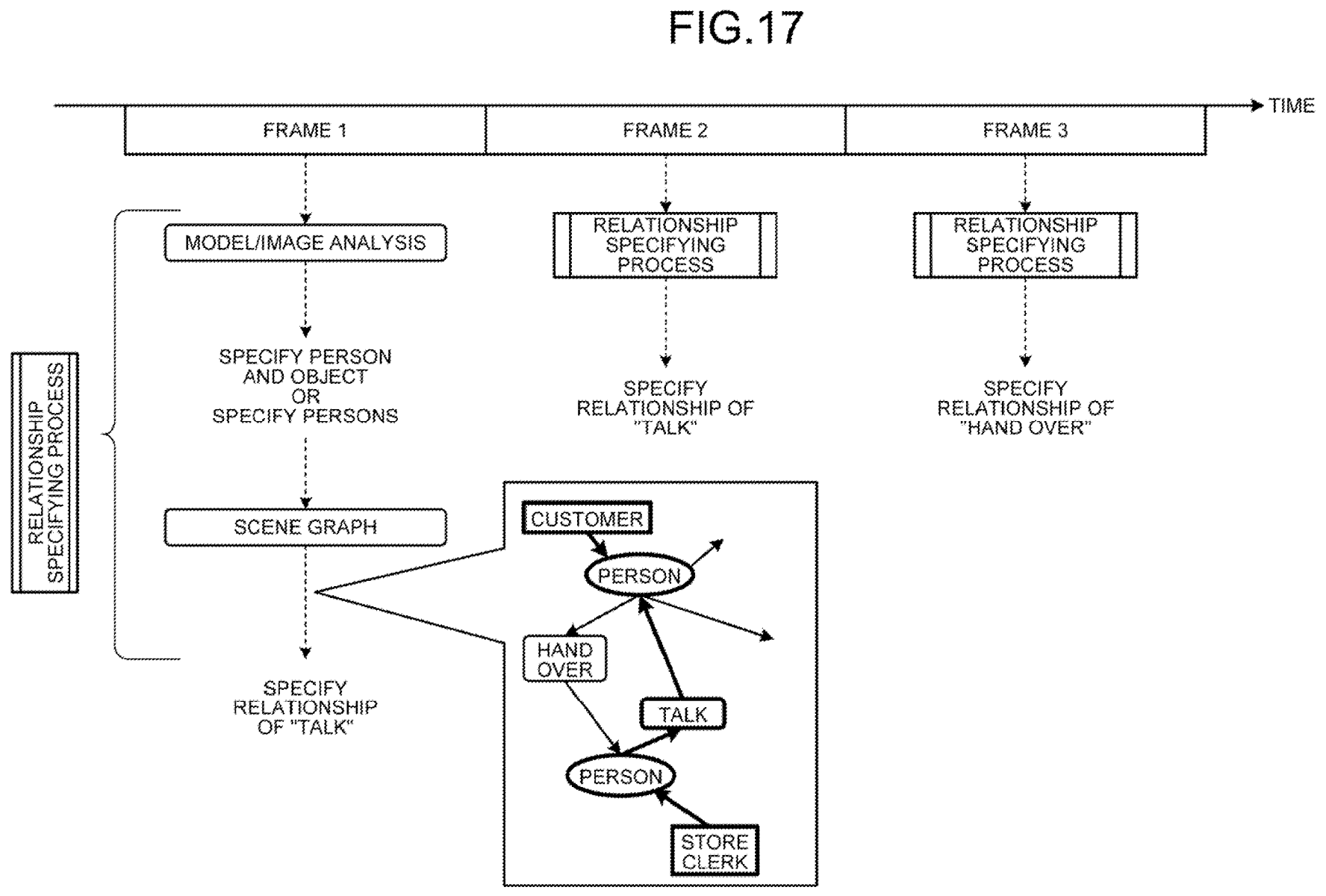

TIME

FRAME 1

MODEL/IMAGE ANALYSIS

SPECIFY PERSON AND OBJECT OR SPECIFY PERSONS

SCENE GRAPH

SPECIFY RELATIONSHIP OF "TALK"

CUSTOMER → PERSON

PERSON → TALK

HAND OVER

TALK → PERSON

PERSON ← STORE CLERK

RELATIONSHIP SPECIFYING PROCESS

FRAME 2

RELATIONSHIP SPECIFYING PROCESS

SPECIFY RELATIONSHIP OF "TALK"

FRAME 3

RELATIONSHIP SPECIFYING PROCESS

SPECIFY RELATIONSHIP OF "HAND OVER"

Figure 24:
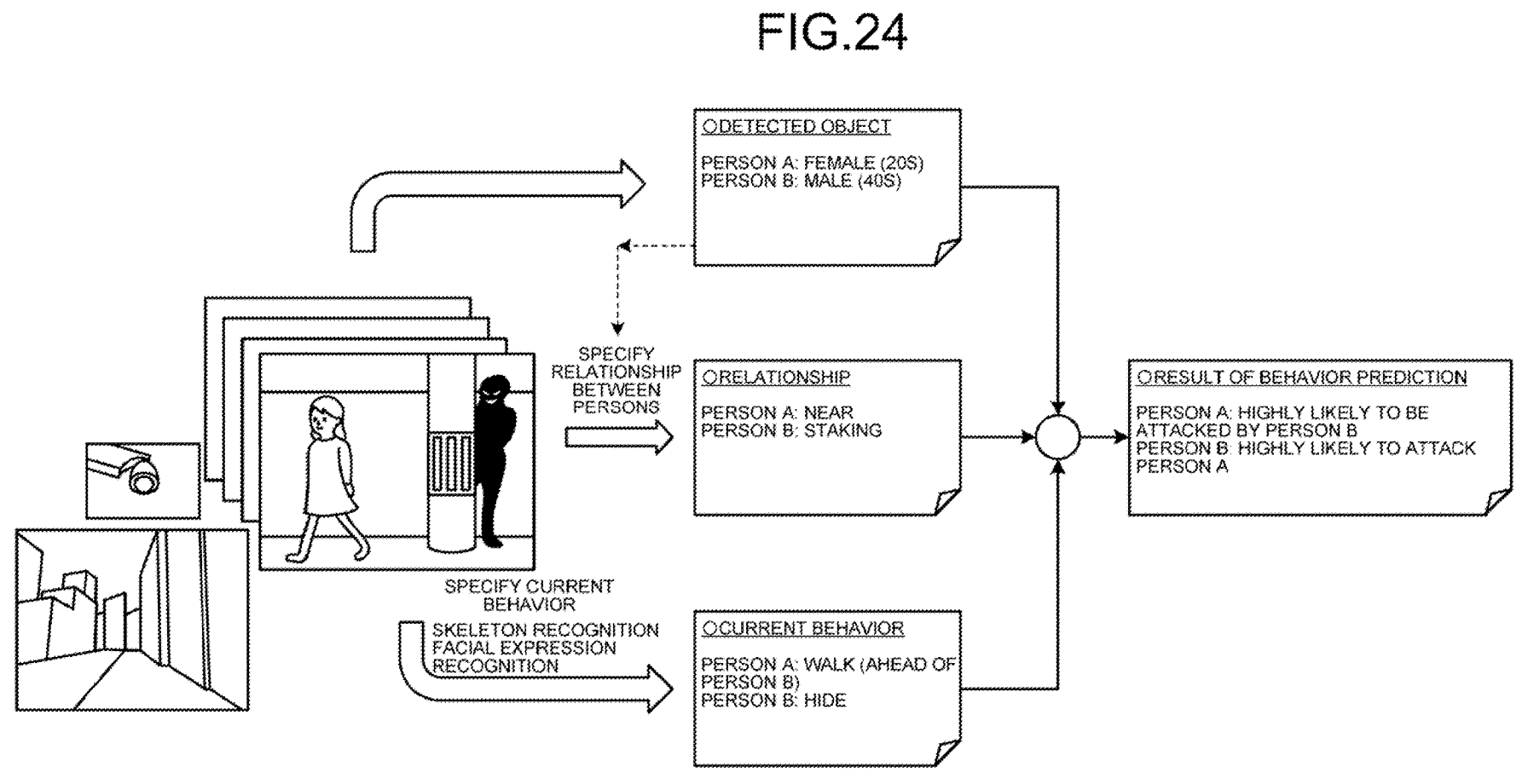

○RESULT OF BEHAVIOR PREDICTION

PERSON A: HIGHLY LIKELY TO BE ATTACKED BY PERSON B
PERSON B: HIGHLY LIKELY TO ATTACK PERSON A

○DETECTED OBJECT

PERSON A: FEMALE (20S)
PERSON B: MALE (40S)

○RELATIONSHIP

PERSON A: NEAR
PERSON B: STAKING

○CURRENT BEHAVIOR

PERSON A: WALK (AHEAD OF PERSON B)
PERSON B: HIDE

SPECIFY RELATIONSHIP BETWEEN PERSONS

SPECIFY CURRENT BEHAVIOR

SKELETON RECOGNITION
FACIAL EXPRESSION RECOGNITION

NON-TRANSITORY COMPUTER-READABLE RECORDING MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-215276, filed on Dec. 28, 2021, the entire contents of which are incorporated herein by reference.

FIELD

The embodiments discussed herein are related to an information processing program, an information processing method, and an information processing apparatus.

BACKGROUND

There is a known behavior recognition technology for recognizing behaviors of persons from video image data. For example, there is a known technology for recognizing, from video image data captured by cameras or the like, motions or behaviors performed by persons by using skeleton information on the persons included in the video image data. In recent years, with the spread of self-service checkout counters in supermarkets or convenience stores or the spread of monitoring cameras in schools, trains, public facilities, or the like, an introduction of human behavior recognition is in progress.

Patent Document 1: International Publication Pamphlet No. WO 2019/049216

SUMMARY

According to an aspect of an embodiment, a non-transitory computer-readable recording medium stores therein an information processing program that causes a computer to execute a process. The process includes acquiring video image data that includes target objects including a person and an object, first specifying, by using graph data that indicates a relationship between each of target objects stored in a storage, a relationship between each of the target objects included in the acquired video image data, second specifying, by using a feature value of the person included in the acquired video image data, a behavior of the person included in the video image data, and predicting, by inputting the specified behavior of the person and the specified relationship to a probability model, a future behavior of a future state of the person.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an information processing apparatus that implements behavior prediction according to the first embodiment;

FIG. 3 is a diagram illustrating a specific example of behavior prediction;

FIG. 6 is a diagram illustrating an example of a facial expression recognition rule;

FIG. 9 is a diagram illustrating an example of generation of a scene graph indicating a relationship between a person and an object;

FIG. 10 is a diagram illustrating an example of generation of a scene graph indicating a relationship between a person and another person;

FIG. 14 is a diagram illustrating movement of markers;

FIG. 17 is a diagram illustrating a process for specifying a relationship;

FIG. 18 is a diagram illustrating a specific example of a process for specifying a current behavior of a person;

FIG. 19 is a diagram illustrating another example of a process for specifying a current behavior of a person;

FIG. 24 is a diagram illustrating an example of a solution to which behavior prediction related to a person and another person is applied.

DESCRIPTION OF EMBODIMENTS

However, a behavior of a person recognized by the behavior recognition technology described above indicates the behavior that is currently performed or that was performed in the past by the person. Therefore, in some cases, even if a countermeasure is taken after recognition of a predetermined behavior performed by the person, it may be too late to take the countermeasure.

Preferred embodiments will be explained with reference to accompanying drawings. Furthermore, the present invention is not limited to the embodiments. In addition, each of the embodiments can be used in any appropriate combination as long as they do not conflict with each other.

[a] First Embodiment

Overall Configuration

Figure 1:
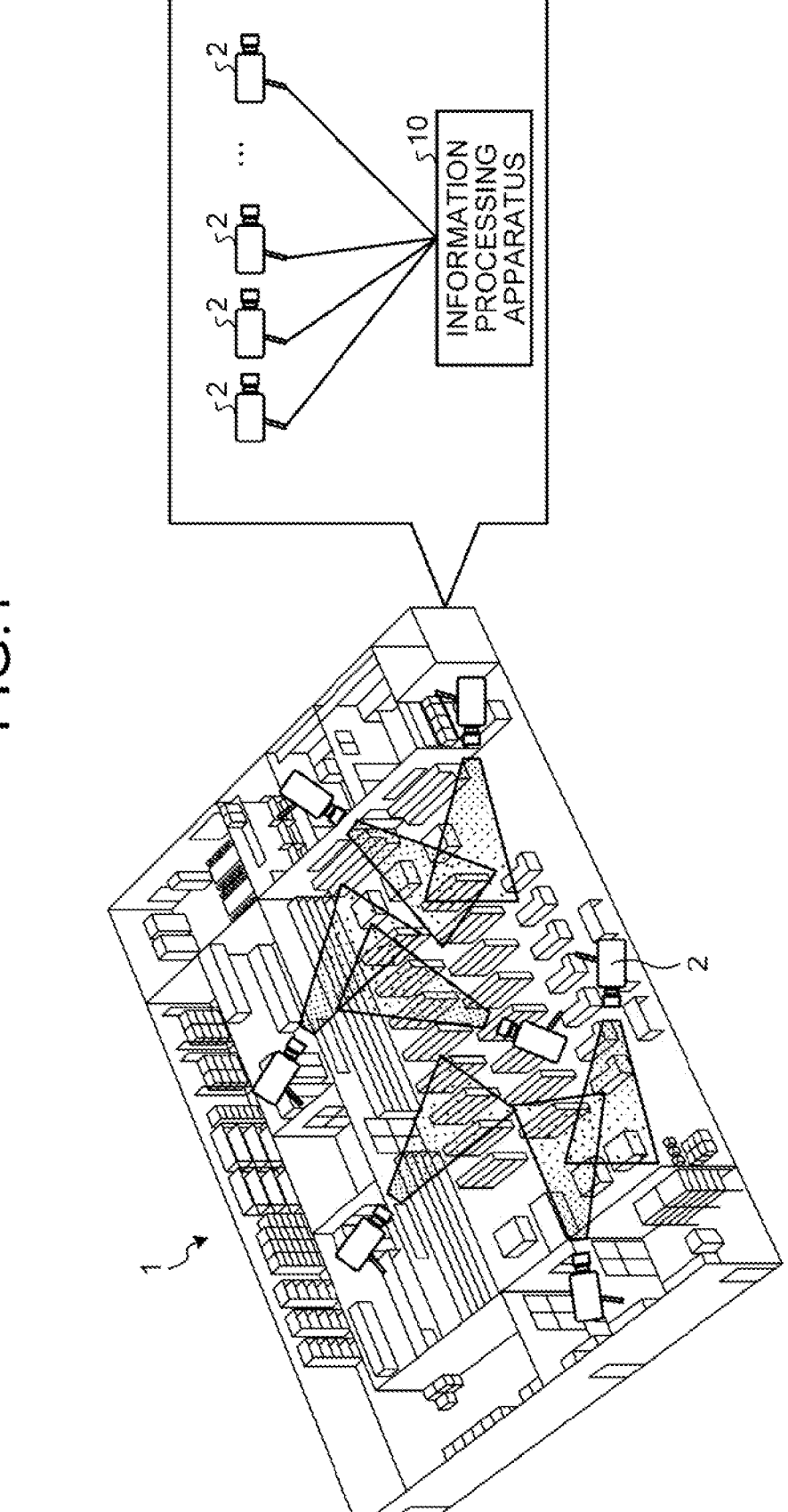
FIG. 1 is a diagram illustrating an example of the overall configuration of a behavior prediction system according to a first embodiment.

FIG. 1 is a diagram illustrating an example of the overall configuration of a behavior prediction system according to a first embodiment. As illustrated in FIG. 1, the behavior prediction system includes a store 1 that is an example of a space, a plurality of cameras 2 each of which is installed in a different location in the store 1, and an information processing apparatus 10 that analyzes video image data.

Each of the plurality of cameras 2 is one example of a monitoring camera that captures an image of a predetermined region in the store 1, and transmits data of the captured video image to the information processing apparatus 10. In a description below, the data of the video image is sometimes referred to as "video image data". Furthermore, the video image data includes a plurality of frames arranged in time series. A frame number is assigned to each of the frames in an ascending order in time series. A single frame is image data of a still image that is captured by one of the cameras 2 at a certain timing.

The information processing apparatus 10 is one example of a computer that analyzes each of the pieces of image data captured by the respective plurality of cameras 2. Furthermore, each of the plurality of cameras 2 and the information processing apparatus 10 are connected with each other by using various networks, such as the Internet or a dedicated line, irrespective of a wired or wireless manner.

In recent years, monitoring cameras are installed not only in the store 1, but also in town, station platforms, and the like, and various services are provided to realize a safe and secure society by using video image data acquired by the monitoring cameras. For example, services for detecting an occurrence of shoplifting, an occurrence of an accident, an occurrence of a suicide by jumping, or the like, and making good use of the detection for dealing with the aftermath are provided. However, all of the services that are currently provided cope with post-detection, and, from the viewpoint of prevention beforehand, it is hard to say that the video image data is effectively used for a sign of shoplifting, a possibility of a suspicious person, a sign of an attack of illness, a sign of a dementia, Alzheimer' disease, or the like that is difficult to be determined at a glance.

Thus, in the first embodiment, the information processing apparatus 10 that implements "behavior prediction" to predict a future behavior or a future internal state of a person by combining "behavior analysis" for analyzing a current facial expression or a current behavior of the person and "context sensing" for detecting a surrounding environment, an object, and a relationship with the environment and the object will be described.

FIG. 2 is a diagram illustrating the information processing apparatus 10 that implements the behavior prediction according to the first embodiment. As illustrated in FIG. 2, the information processing apparatus 10 specifies a relationship and performs behavior recognition on a behavior of a person with respect to video image data and performs behavior prediction on a behavior of the person by using the specified relationship and the recognized behavior.

Specifically, the information processing apparatus 10 acquires video image data that includes target objects including a person and an object. Then, the information processing apparatus 10 specifies a relationship between each of the target objects included in the video image data by using a graph data that indicates a relationship between each of target objects stored in the storage unit. In contrast, the information processing apparatus 10 specifies a current behavior of the person included in the video image data by using a feature value of the person included in the video image data. After that, the information processing apparatus 10 predicts, by inputting the specified current behavior of the person and the specified relationship to a probability model, a future behavior of the person, such as a sign of shoplifting, or a future state of the person, such as Alzheimer.

For example, as illustrated in FIG. 2, the information processing apparatus 10 specifies a relationship between a person and another person or a relationship between a person or an object by specifying a type of a person, a type of an object, and the like that are included in the video image data and searching graph data, such as a scene graph, in which various relationships are defined in advance, by using the specified information.

Furthermore, the information processing apparatus 10 performs behavior recognition on a current behavior of the person by using both of a behavior analyzer and a facial expression analyzer. Specifically, the behavior analyzer acquires, by inputting the video image data to a trained skeleton recognition model, skeleton information that is related to the person and that is one example of a feature value. The facial expression recognizer acquires, by inputting the video image data to a trained facial expression recognition model, facial expression information that is related to the person and that is one example of a feature value. Then, the information processing apparatus 10 refers to a behavior specific rule that is defined in advance, and recognizes a current behavior of the person corresponding to the specified combination of the skeleton information and the facial expression information on the person.

After that, the information processing apparatus 10 inputs the relationship between the person and another person or the relationship between the person and the object and the current behavior of the person to the probability model that is one example of a model constituted by using a hidden Markov model or the like, and acquires a result of the behavior prediction of the future behavior of the person.

Here, regarding the behavior that is predicted by the information processing apparatus 10, it is possible to perform various predictions from a short term prediction to a long term prediction. FIG. 3 is a diagram illustrating a specific example of the behavior prediction. As illustrated in FIG. 3, the behavior prediction that is performed by the information processing apparatus includes not only a "behavior", such as a purchase behavior and a behavior of shoplifting, that is able to be determined by an external appearance of a person, a "feeling" and a "state", such as a disease, that is difficult to be determined by an external appearance of the person and that is affected by an internal state of the person.

Specifically, the information processing apparatus 10 predicts, as a super short term prediction to be performed after a few seconds to a few minutes, an occurrence or a need of a "human support by a robot", an "online communication support", or the like. The information processing apparatus 10 predicts, as a short term prediction to be performed after a few hours, an occurrence of an unexpected event, such as a "purchase behavior in a store", a "crime, such as shoplifting or stalking", or a "suicide behavior", or an event that occurs with a small amount of movement from a place in which a current behavior is performed. The information processing apparatus 10 predicts, as a medium term prediction to be performed after a few days, an occurrence of a planned crime, such as a "police box attack" or "domestic violence". The information processing apparatus 10 predicts, as a long term prediction to be performed after a few months, an occurrence of a potential event (state), such as an "improvement in grade of study or sales" or a "prediction of disease, such as Alzheimer" that is not recognizable by an appearance.

In this way, the information processing apparatus 10 is able to detect a situation in which a countermeasure is needed in advance from the video image data, so that it is possible to provide a service that intends to provide a safe and secure society.

Functional Configuration

Figure 4:
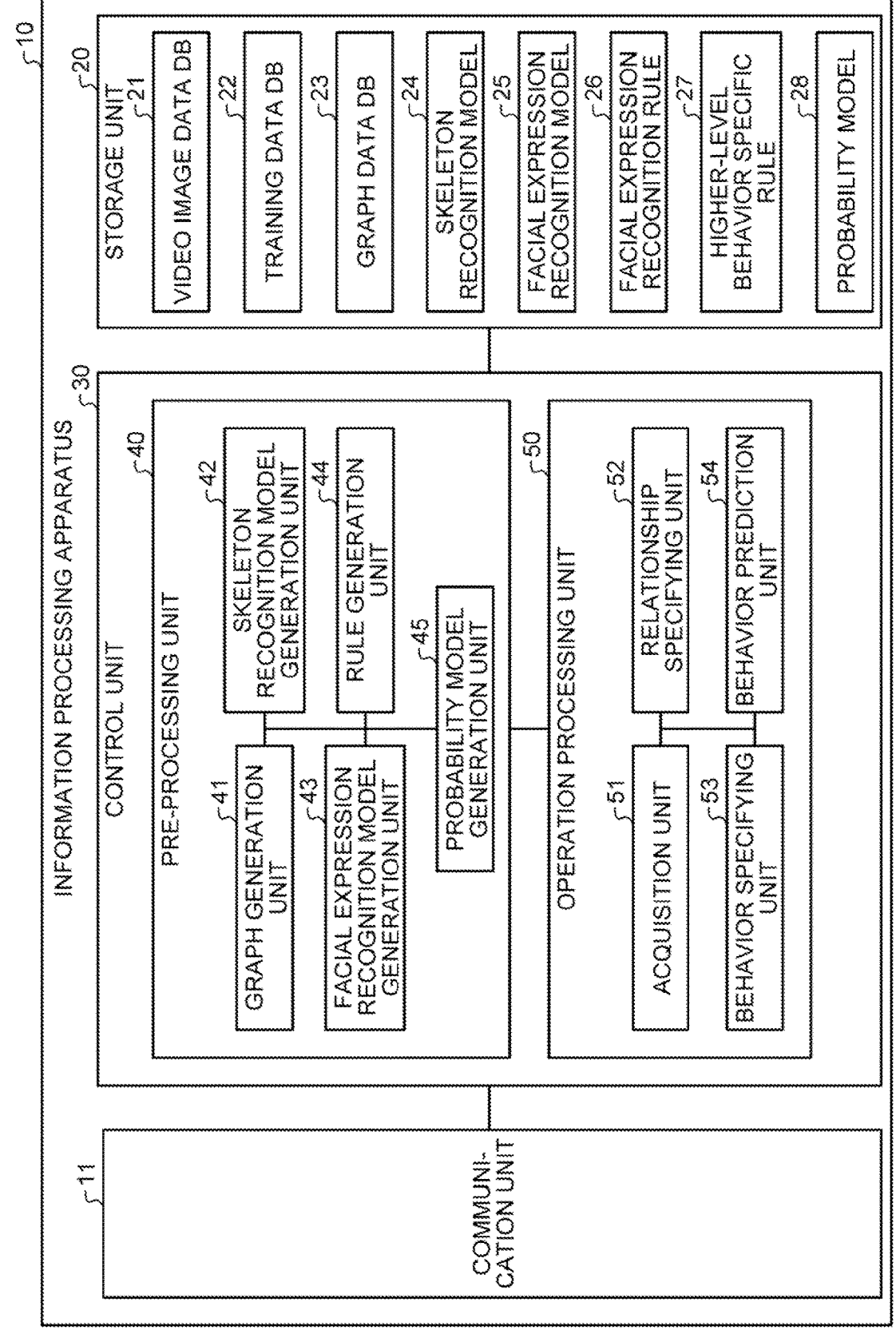
FIG. 4 is a functional block diagram illustrating a functional configuration of the information processing apparatus according to the first embodiment.

FIG. 4 is a functional block diagram illustrating a functional configuration of the information processing apparatus 10 according to the first embodiment. As illustrated in FIG. 4, the information processing apparatus 10 includes a communication unit 11, a storage unit 20, and a control unit 30.

The communication unit 11 is a processing unit that controls communication with another device and is implemented by, for example, a communication interface or the like. For example, the communication unit 11 receives video image data or the like from each of the cameras 2, and outputs a processing result or the like obtained by the information processing apparatus 10 to a device or the like that is designated in advance.

The storage unit 20 is a processing unit that stores therein various kinds of data, a program executed by the control unit 30, or the like and is implemented by, for example, a memory, a hard disk, or the like. The storage unit 20 stores therein a video image data DB 21, a training data DB 22, a graph data DB 23, a skeleton recognition model 24, a facial expression recognition model 25, a facial expression recognition rule 26, a higher-level behavior specific rule 27, and a probability model 28.

The video image data DB 21 is a database that stores therein video image data that is captured by each of the plurality of cameras 2 that are installed in the store 1. For example, the video image data DB 21 stores therein video image data for each of the cameras 2 or for each period of time for which images are captured.

The training data DB 22 is a database that stores therein graph data and various kinds of training data, such as the skeleton recognition model 24, the facial expression recognition model 25, and the probability model 28, that are used to generate various machine learning models. The training data stored here includes supervised learning data to which correct answer information is added and unsupervised learning data to which correct answer information is not added.

The graph data DB 23 is a database that stores therein a scene graph that is one example of graph data that indicates a relationship between each of the target objects that are included in the video image data. Specifically, the graph data DB 23 stores therein a scene graph in which a relationship between a person and another person and/or a relationship between a person and an object. In other words, the scene graph is the graph data in which each of the objects (a person, a commodity product, etc.) that are included in each of the pieces of image data included in the video image data and a relationship between each of the objects are described.

Figure 5:
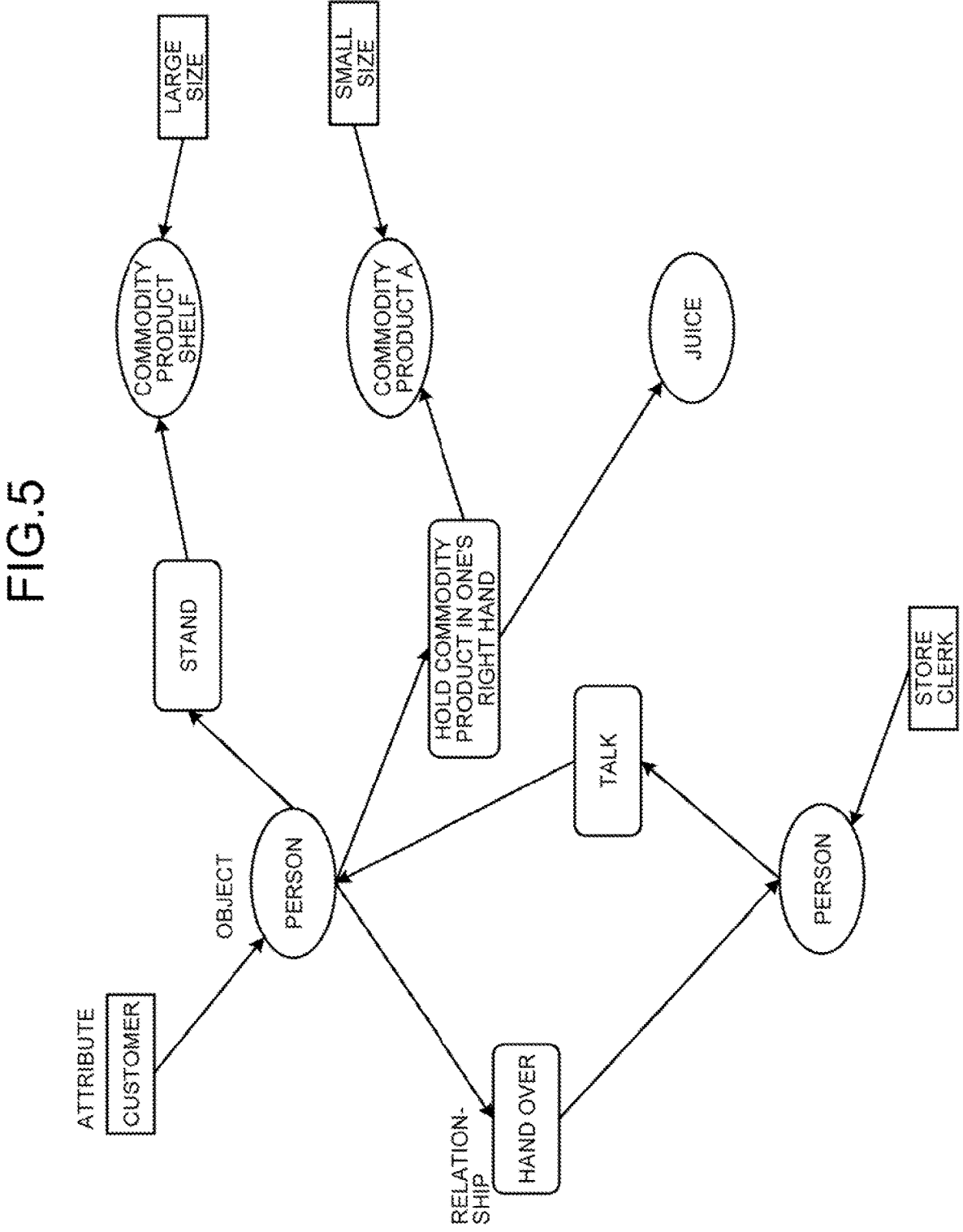
FIG. 5 is a diagram illustrating an example of a scene graph.

FIG. 5 is an example of a scene graph. As illustrated in FIG. 5, the scene graph is a directed graph in which objects that appear in image data are set to be nodes, each of the nodes has an attribute (for example, a type of the object), and relationships between the nodes are set to be directed edges. In the example illustrated in FIG. 5, it is indicated that a node of a "person" with an attribute of a "store clerk" has a relationship of "talk" with respect to a node of a "person" with an attribute of a "customer". In other words, a relationship indicating that "the store clerk talks with the customer" is defined. Furthermore, it is indicated that the node of the "person" with the attribute of the "customer" has a relationship of "stand" with respect to a node of a "commodity product" with an attribute of a "large size". In other words, a relationship indicating that "the customer stands in front of a commodity product shelf of a large size commodity product" is defined.

The relationship indicated here is only an example. For example, the relationship includes not only a simple relationship, such as "hold", but also a complex relationship, such as "hold a commodity product A in one's right hand", "stalking a person walking ahead", or "look over one's shoulder". Furthermore, the graph data DB 23 may store therein each of a scene graph associated with a relationship between a person and another person and a scene graph associated with a relationship between a person and an object, or may store therein a single scene graph that includes each of the relationships. In addition, the scene graph is generated by the control unit 30 that will be described later, but it may be possible to use data that is generated in advance.

The skeleton recognition model 24 is one example of a first machine learning model for generating skeleton information that is one example of a feature value of a person. Specifically, the skeleton recognition model 24 outputs two-dimensional skeleton information in accordance with an input of image data. For example, the skeleton recognition model 24 is one example of a deep learning device that estimates a two-dimensional joint position (skeleton coordinates), such as a head, a wrist, a hip, or an ankle, with respect to two-dimensional image data of a person and that recognizes a motion corresponding to a basic motion or recognizes a rule that is defined by a user.

By using the skeleton recognition model 24, it is possible to recognize a basic motion of a person and acquire a position of an ankle, an orientation of a face, and an orientation of the body. Examples of the basic motion include, walk, run, and stop. An example of the rule defined by the user includes a transition of the skeleton information that corresponds to each of behaviors that are performed before a behavior of picking up a commodity product in hand. Furthermore, the skeleton recognition model 24 is generated by the control unit 30 that will be described later, but it may be possible to use data that is generated in advance.

The facial expression recognition model 25 is one example of a second machine learning model for generating facial expression information related to a facial expression that is one example of a feature value of a person. Specifically, the facial expression recognition model 25 is a machine learning model that estimates an action unit (AU) that is a method for disassembling and quantifying a facial expression on the basis of parts of a face and muscles of facial expression. The facial expression recognition model 25 outputs, in accordance with an input of image data, a facial expression recognition result, such as "AU 1: 2, AU 2: 5, AU 4: 1, . . . ", that represents an occurrence intensity (for example, 5-grade evaluation) of each of the AUs from an AU 1 to an AU 28 that are set in order to specify a facial expression. Furthermore, the facial expression recognition model 25 is generated by the control unit 30 that will be described later, but it may be possible to use data that is generated in advance.

The facial expression recognition rule 26 is a rule for recognizing a facial expression by using an output result obtained from the facial expression recognition model 25. FIG. 6 is a diagram illustrating an example of the facial expression recognition rule 26. As illustrated in FIG. 6, the facial expression recognition rule 26 stores therein a "facial expression" and an "estimation result" in an associated manner. The "facial expression" is a facial expression of a recognition target, whereas the "estimation result" is the intensity of each of the AUs of the AU 1 to the AU 28 that correspond to the respective facial expressions. In the example illustrated in FIG. 6, if "the AU 1 has the intensity of 2, the AU 2 has the intensity of 5, and the AU 3 has the intensity of 0 . . . ", this indicates that a facial expression is recognized as a "smile". Furthermore, the facial expression recognition rule 26 is data that is registered in advance by an administrator or the like.

Figure 7:
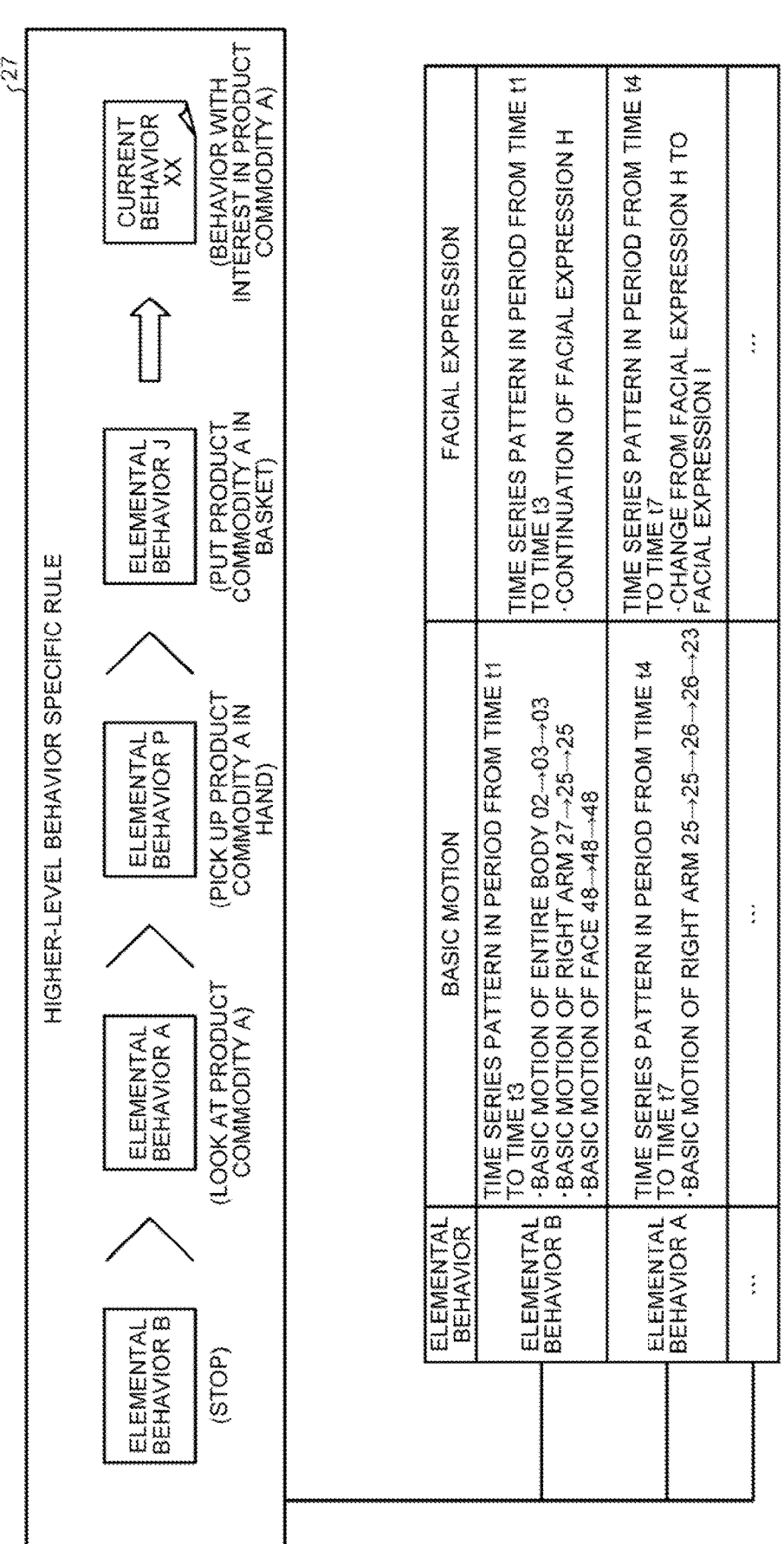
FIG. 7 is a diagram illustrating an example of a higher-level behavior specific rule.

The higher-level behavior specific rule 27 is a rule for specifying a current behavior performed by a person. FIG. 7 is a diagram illustrating an example of the higher-level behavior specific rule 27. As illustrated in FIG. 7, the higher-level behavior specific rule 27 is a rule in which a current behavior and a transition of elemental behaviors are associated with each other in order to specify the current behavior.

In the example illustrated in FIG. 7, if an elemental behavior B, an elemental behavior A, an elemental behavior P, and an elemental behavior J are sequentially performed in this order, it is defined that this state is specified as a current behavior XX. For example, the current behavior XX is a "behavior with interest in the commodity product A", the elemental behavior B is "stop", the elemental behavior A is "look at the commodity product A", the elemental behavior P is "pick up the commodity product A in hand", the elemental behavior J is "put the commodity product A into a basket", or the like.

Furthermore, each of the elemental behaviors is associated with a basic motion and a facial expression. For example, regarding the elemental behavior B, information indicating that, for the basic motion, "as a time series pattern in a period of time from a time t1 to a time t3, the basic motion of the entire body is transitioned to basic motions 02, 03, and 03, the basic motion of a right arm is transitioned to basic motions 27, 25, and 25, and the basic motion of a face is transitioned to basic motions 48, 48, and 48", and information indicating that, for the facial expression, "as a time series pattern in a period of time from the time t1 to time t3, a facial expression H continues" are defined.

Furthermore, the representation, such as the basic motion 02, is denoted by using an identifier for identifying each of the basic motions in terms of explanation, and corresponds to, for example, stop, raise an arm, squat down, or the like. Similarly, the representation, such as the facial expression H, is denoted by using an identifier for identifying each of the facial expressions in terms of explanation, and corresponds to, for example, a smiling face, an angry face, or the like. Furthermore, the higher-level behavior specific rule 27 is generated by the control unit 30 that will be described later, but it may be possible to use data that is generated in advance.

The probability model 28 is one example of a probability model for predicting a future behavior or a future state of a person from the basic motion and the facial expression information. For example, in the probability model 28, it is possible to use a hidden Markov model (HMM) in which, in a circumstance in which a state is not able to be observed, a variable value that is observable depending on the state is determined. Furthermore, in the present embodiment, the state of the hidden Markov model corresponds to a future behavior, and the variable value corresponds to observation information that includes a current behavior (or a combination of the skeleton information and the facial expression) and a relationship. In addition, a transition probability is defined between each of the states, and a probability distribution representing a relationship between the state and the observation information is defined between the state and the observation information.

Figure 8:
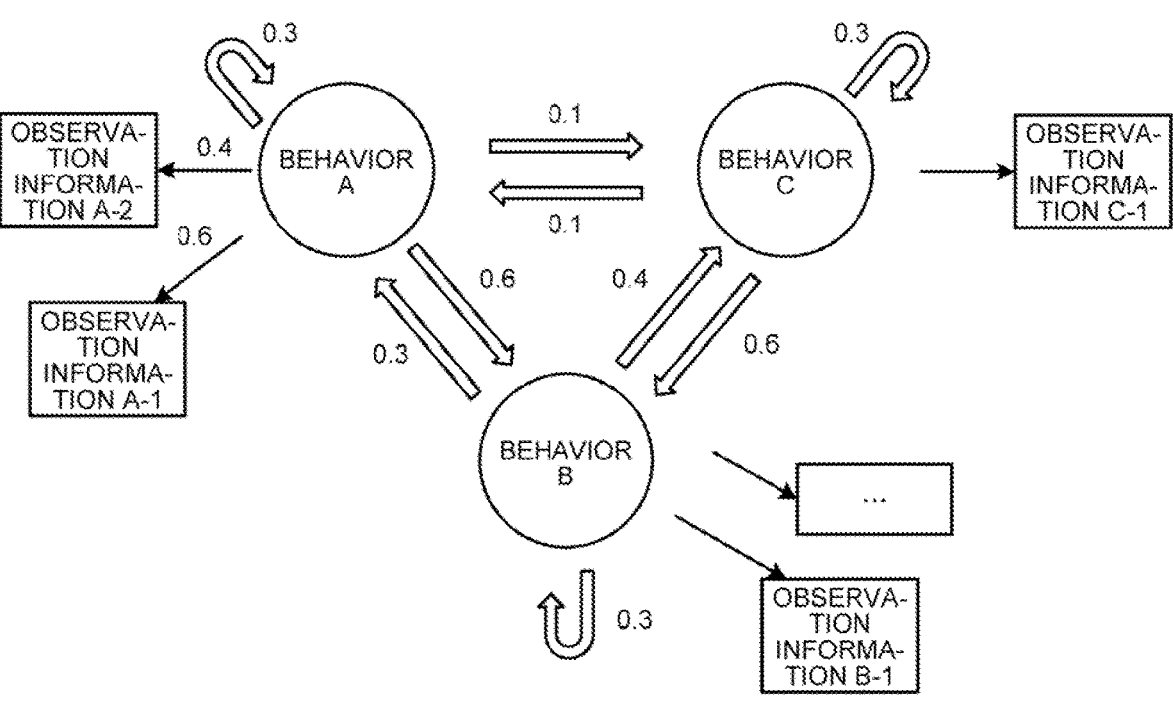
FIG. 8 is a diagram illustrating an example of a probability model.

FIG. 8 is a diagram illustrating an example of the probability model 28. As illustrated in FIG. 8, the probability model 28 is a hidden Markov model that includes, as the states, the behavior A, the behavior B, and the behavior C that are the prediction targets, and in which a transition probability between each of the states is trained and a probability distribution between the states and pieces of observable information (observation information) is also trained.

For example, in the hidden Markov model illustrated in FIG. 8, it is indicated that, regarding the behavior A, a probability of a transition from the behavior A to the behavior A is 30%, a probability of a transition from the behavior A to the behavior B is 60%, and a probability of a transition from the behavior A to the behavior C is 10%. Furthermore, the hidden Markov model illustrated in FIG. 8, it is indicated that observation information A-1 and observation information A-2 are associated with respect to the behavior A, and it is indicated that a probability of an observation of the observation information A-1 is 60% and a probability of an observation of the observation information A-2 is 40% at the time of the state of the behavior A.

In other words, by using the hidden Markov model as described above, the information processing apparatus 10 is able to estimate a behavior by using the observation information obtained during a period of time from a past to the present, and predict a future behavior (behavior that will be performed in the future) with respect to the probability of the estimated behavior only from the transition probabilities obtained from the hidden Markov model.

Furthermore, the observation information that is used in the hidden Markov model is able to be arbitrarily changed. For example, it is possible to use, as the observation information, a "current behavior" and a "relationship" and adopt, as each of the states, the hidden Markov model that uses a "behavior of a prediction target". In other words, if the observation information on "the current behavior and the relationship" obtained from the video image data is input, the hidden Markov model estimates a near future or a current "behavior" by using the observation information. Then, the information processing apparatus 10 predicts, in accordance with the hidden Markov model, a "behavior" with the highest transition probability on the basis of the estimated "behavior" as a future behavior.

In this way, the information processing apparatus 10 is able to use the hidden Markov model, re-predict the current behavior that is specified from the skeleton information or the like, and performs future behavior prediction after increasing reliability of the current behavior, so that it is possible to expect an increase in accuracy.

As another example, it is possible to apply a hidden Markov model that uses, as the observation information, "the skeleton information and the facial expression obtained up to the current" and a "relationship" and that uses, as each of the states, a "behavior of a prediction target". In other words, if observation information on "the current skeleton information, the facial expression, and the relationship"

obtained from the video image data is input, the hidden Markov model estimates a current "behavior" from the obtained observation information. Then, the information processing apparatus 10 predicts and outputs, in accordance with the hidden Markov model, a "behavior" with the highest transition probability as a future behavior on the basis of the estimated current "behavior".

In this way, the information processing apparatus 10 is able to perform the future behavior prediction after having directly predicted the current behavior from the skeleton information or the like by using the hidden Markov model, so that it is possible to expect an increase in a prediction speed.

A description will be given here by referring back to FIG. 4. The control unit 30 is a processing unit that manages the entire of the information processing apparatus 10 and is implemented by, for example, a processor or the like. The control unit 30 includes a pre-processing unit 40 and an operation processing unit 50. Furthermore, the pre-processing unit 40 and the operation processing unit 50 are implemented by an electronic circuit that is included in a processor or implemented by a process or the like that is executed by the processor.

Pre-Processing Unit 40

The pre-processing unit 40 is a processing unit that generates each of the models, the rules, and the like by using the training data that is stored in the storage unit 20 before an operation of the behavior prediction is performed. The pre-processing unit 40 includes a graph generation unit 41, a skeleton recognition model generation unit 42, a facial expression recognition model generation unit 43, a rule generation unit 44, and a probability model generation unit 45.

Generation of Scene Graph

The graph generation unit 41 is a processing unit that generates a scene graph stored in the graph data DB 23. Specifically, the graph generation unit 41 uses a recognition model that performs person recognition, object recognition, or the like with respect to image data, and generates a scene graph that indicates a relationship between a person and another person or a scene graph that indicates a relationship between a person and an object.

Figure 9:
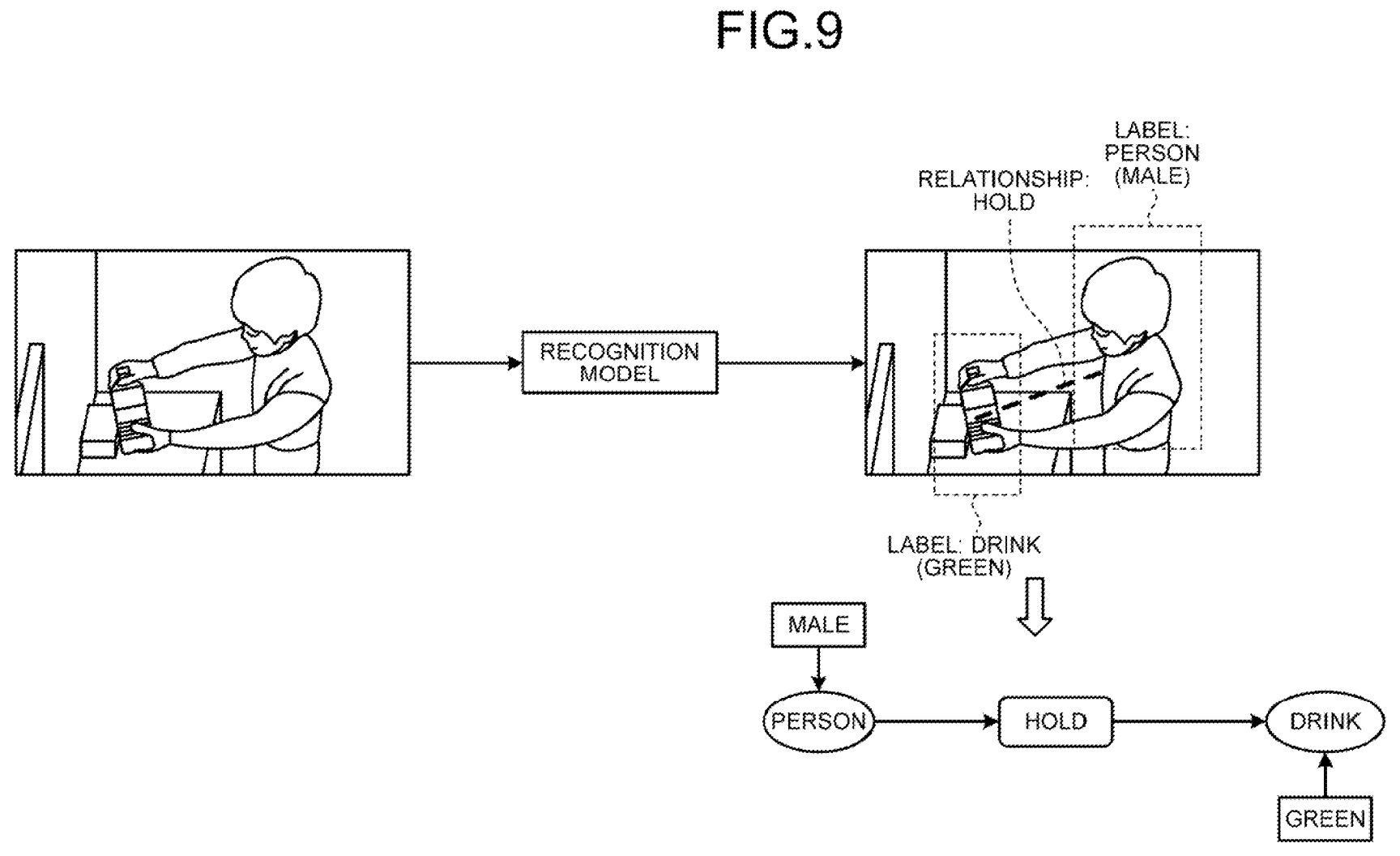

FIG. 9 is a diagram illustrating an example of generation of the scene graph that indicates a relationship between a person and an object. As illustrated in FIG. 9, the graph generation unit 41 inputs image data to the recognition model, and acquires, as an output result of the recognition model, a label of a "person (male)", a label of "drink (green)", and a relationship "hold". In other words, the graph generation unit 41 acquires information indicating that a "male holds a green drink". As a result, the graph generation unit 41 generates a scene graph in which the node of the "person" having the attribute of "male" is correlated with a relationship of "hold" with respect to a node of a "drink" having the attribute of "green".

Figure 10:
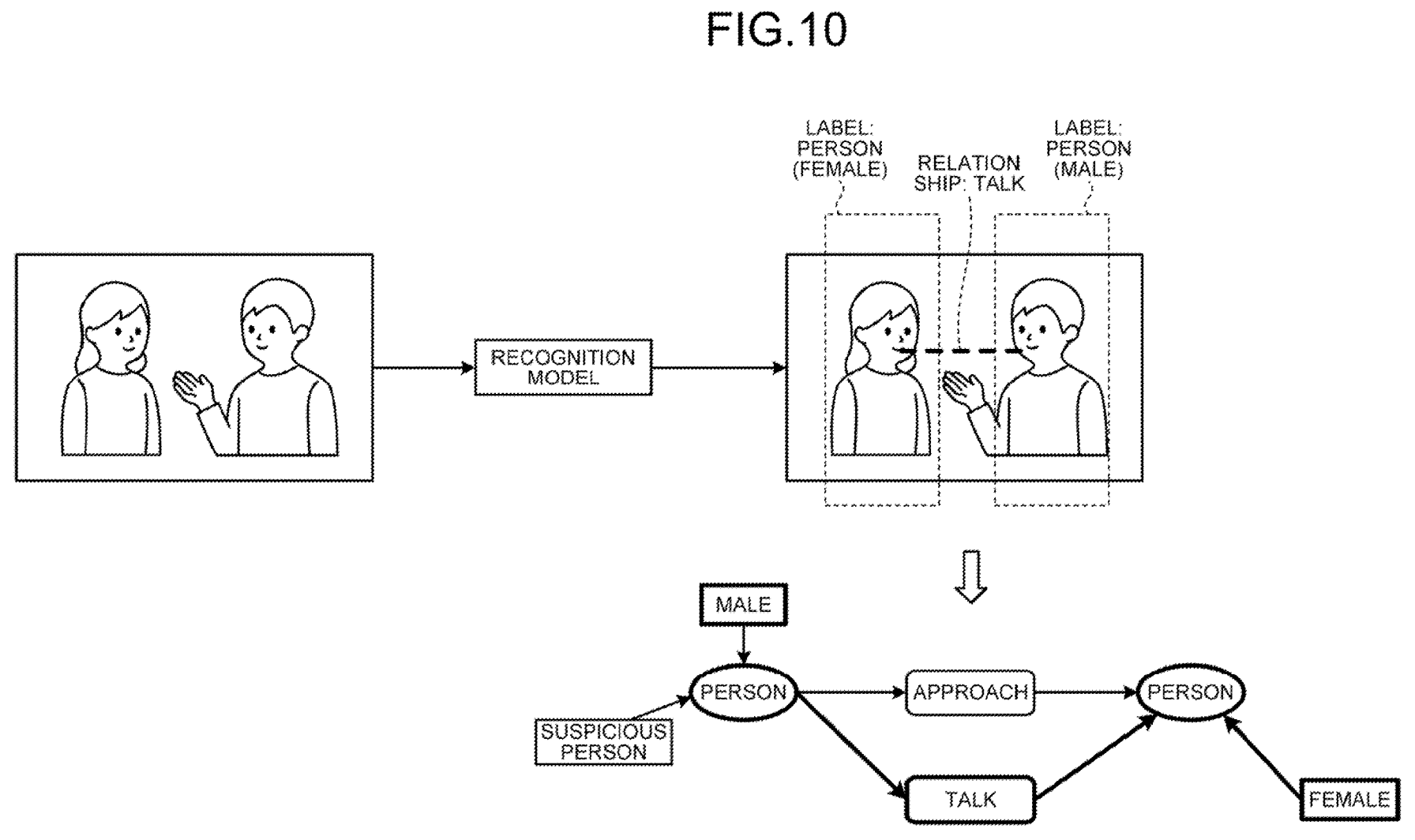

FIG. 10 is a diagram illustrating an example of generation of a scene graph that indicates a relationship between a person and another person. As illustrated in FIG. 10, the graph generation unit 41 inputs image data to the recognition model, and acquires, as an output result of the recognition model, a label of a "person (male)", a label of a "person (female)", and a relationship "talk". In other words, the graph generation unit 41 acquires information indicating that "male is talking to female". As a result, the graph generation unit 41 adds the relationship of "talk" output from node of the "person" having the attribute of "male" to the node of the "person" having the attribute of "female" to the scene graph that has a relationship of "approach" extending from the node of the "person" having the attribute of "suspicious person" to the node of the "person" having the attribute of "female".

Furthermore, generation of the scene graph is only one example, and it may be possible to use another method or it may be possible to manually generate the scene graph by an administrator or the like.

Generation of Skeleton Recognition Model 24

The skeleton recognition model generation unit 42 is a processing unit that generates the skeleton recognition model 24 by using the training data. Specifically, the skeleton recognition model generation unit 42 generates the skeleton recognition model 24 by performing supervised learning that is performed by using the training data with correct answer information (label) attached.

Figure 11:
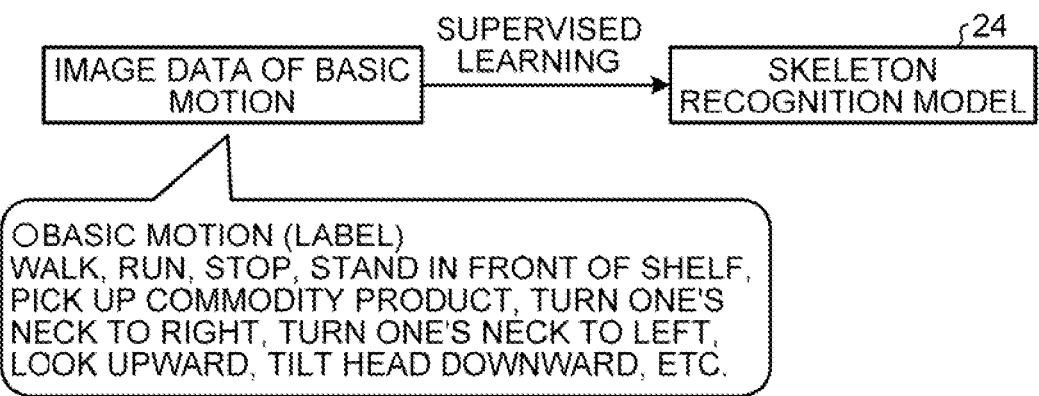
FIG. 11 is a diagram illustrating an example of generation of a skeleton recognition model.

FIG. 11 is a diagram illustrating a process for generating the skeleton recognition model 24. As illustrated in FIG. 11, the skeleton recognition model generation unit 42 inputs, to the skeleton recognition model 24, the image data on the basic motion to which a label for the basic motion is assigned, and performs machine learning on the skeleton recognition model 24 such that an error between an output result of the skeleton recognition model 24 and the label is decreased. For example, the skeleton recognition model 24 is a neural network. The skeleton recognition model generation unit 42 changes a parameter of the neural network by performing the machine learning for the skeleton recognition model 24. The skeleton recognition model 24 inputs, to the neural network, an explanatory variable that is image data (for example, image data on a person who is performing a motion of the basic motion). Then, the skeleton recognition model 24 generates a machine learning model, in which the parameter of the neural network has been changed, such that an error between the output result that is output from the neural network and the correct answer data that is a label of the basic motion is decreased.

In addition, it is possible to use, for the training data, each of the pieces of image data to which "walk", "run", "stop", "stand up", "stand in front of a shelf", "pick up a commodity product", "turn one's neck to right", "turn one's neck to left", "look upward", "tilt one's head downward", or the like is added as the "label". Furthermore, generation of the skeleton recognition model 24 is only one example, and it is possible to use another method. In addition, it may also be possible to use, as the skeleton recognition model 24, behavior recognition that is disclosed in Japanese Laid-open Patent Publication No. 2020-71665 and Japanese Laid-open Patent Publication No. 2020-77343.

Generation of Facial Expression Recognition Model 25

The facial expression recognition model generation unit 43 is a processing unit that generates the facial expression recognition model 25 by using the training data. Specifically, the facial expression recognition model generation unit 43 generates the facial expression recognition model 25 by performing supervised learning using training data to which correct answer information (label) is added.

Figure 12:
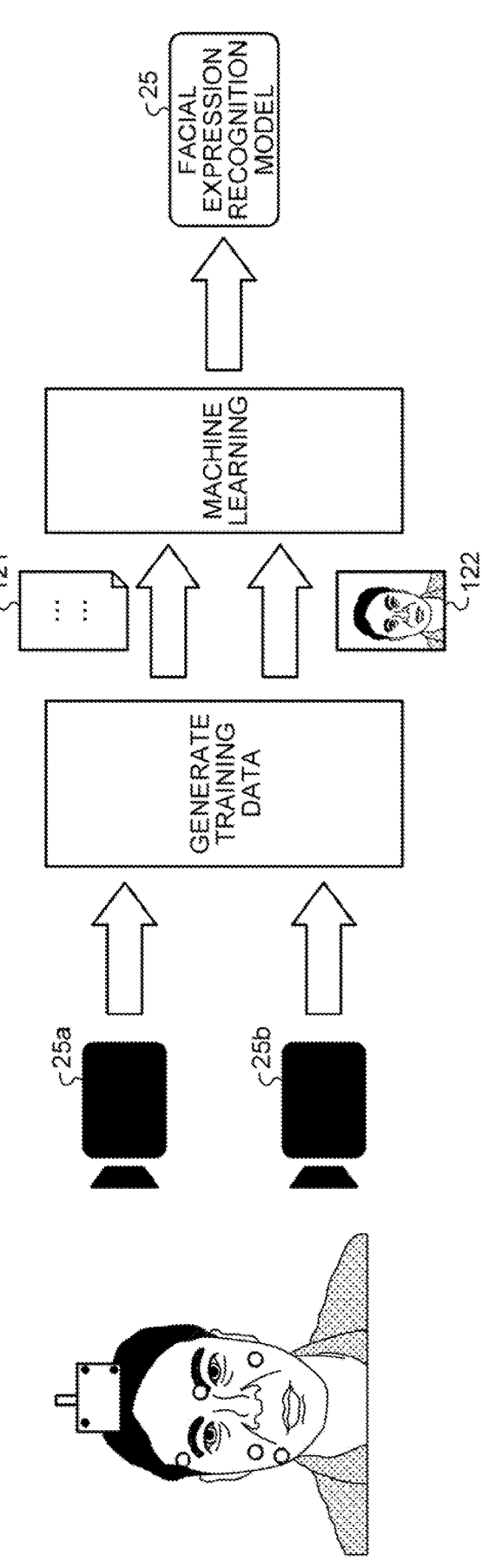
FIG. 12 is a diagram illustrating an example of generation of a facial expression recognition model.
Figure 13:
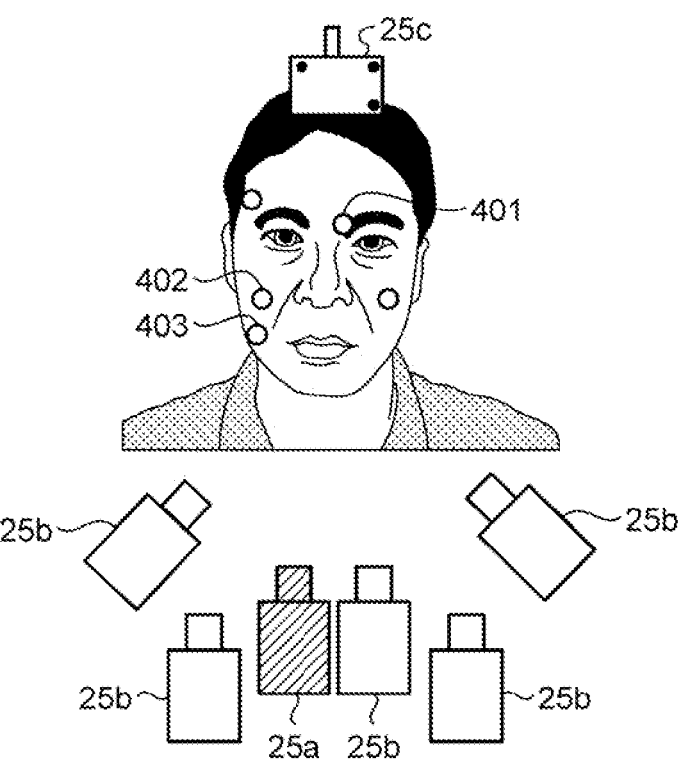
FIG. 13 is a diagram illustrating an example of arrangement of cameras.
Figure 14:
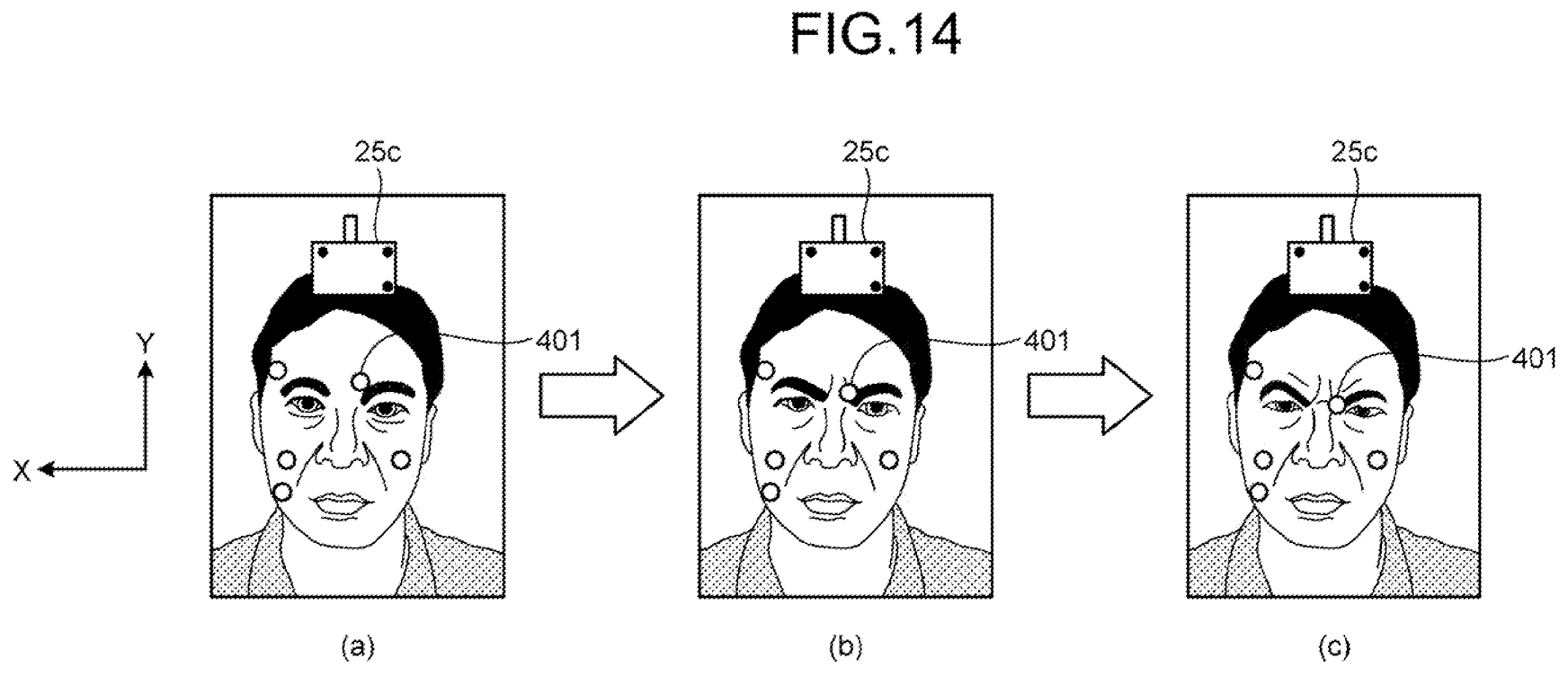

In the following, generation of the facial expression recognition model 25 will be described with reference to FIG. 12 to FIG. 14. FIG. 12 is a diagram for illustrating an example of generation of the facial expression recognition model 25. As illustrated in FIG. 12, the facial expression recognition model generation unit 43 generates training data and performs machine learning with respect to image data that is captured by each of a red-green-blue (RGB) camera 25a and an infrared (IR) camera 25b.

As illustrated in FIG. 12, first, the RGB camera 25*a* and the IR camera 25*b* are oriented toward a face of a person to which markers are attached. For example, the RGB camera 25*a* is a common digital camera that receives visible light and generates an image. Furthermore, for example, the IR camera 25*b* senses infrared rays. In addition, the markers are, for example, IR reflection (recursive reflection) markers. The IR camera 25*b* is able to perform motion capture by using IR reflection generated by the markers. In addition, in a description below, a person targeted for image capturing will be referred to as a subject.

In a process for generating training data, the facial expression recognition model generation unit 43 acquires image data that is captured by the RGB camera 25*a* and a result of the motion capture that is obtained by the IR camera 25*b*. Then, the facial expression recognition model generation unit 43 generates an occurrence intensity 121 of an AU and image data 122 in which markers are deleted from the image data on the captured image by performing image processing. For example, the occurrence intensity 121 may be data that represents the occurrence intensity of each of the AUs in five-grade evaluation using A to E, and to which annotation, such as "AU 1: 2, AU 2: 5, AU 4: 1, . . . ", is added.

In a process of machine learning, the facial expression recognition model generation unit 43 performs machine learning by using the image data 122 and the occurrence intensity 121 of each of the AUs that are output from the generation process performed on the training data, and generates the facial expression recognition model 25 that is used to estimate an occurrence intensity of each of the AUs from the image data. The facial expression recognition model generation unit 43 is able to use the occurrence intensity of each of the AUs as a label.

In the following, arrangement of the cameras will be described below with reference to FIG. 13. FIG. 13 is a diagram illustrating an example of arrangement of the camera. As illustrated in FIG. 13, the plurality of IR cameras 25*b* may constitute a marker tracking system. In this case, the marker tracking system is able to detect positions of the IR reflection markers by stereo image capturing. Furthermore, it is assumed that relative positional relationships among the plurality of IR cameras 25*b* are corrected in advance by camera calibration.

Furthermore, a plurality of markers are attached to a face of the subject whose image is captured so as to cover the AU 1 to the AU 28. The positions of the markers are changed in accordance with a change in a facial expression of the subject. For example, a marker 401 is arranged in the vicinity of an inner corner of an eyebrow (glabella). In addition, a marker 402 and a marker 403 are arranged in the vicinity of the smile line (nasolabial fold). The markers may also be arranged on the skin associated with one or more AUs and motions of muscles of facial expression. In addition, the markers may also be arranged so as to avoid the skin on which a texture is largely changed due to wrinkles or the like.

Furthermore, the subject wears an instrument 25*c* to which reference point markers are attached on the outside of the face contour. It is assumed that the positions of the reference point markers attached to the instrument 25*c* are not changed even if the facial expression of the subject is changed. As a result, the facial expression recognition model generation unit 43 is able to detect a change in the positions of the markers attached to the face on the basis of a change in the relative position from each of the reference point markers. Furthermore, by setting the number of reference point markers to three or more, the facial expression recognition model generation unit 43 is able to specify the positions of the markers in a three-dimensional space.

The instrument 25*c* is, for example, a headband. Furthermore, the instrument 25*c* may be a VR headset, a mask made of a hard material, or the like. In this case, the facial expression recognition model generation unit 43 is able to use a rigid surface of the instrument 25*c* as the reference point marker.

Furthermore, when images are captured by the IR cameras 25*b* and the RGB camera 25*a*, the subject continuously changes the facial expression. As a result, it is possible to acquire, as an image, a state of a change in the facial expression along the time series. Furthermore, the RGB camera 25*a* may also capture a moving image. The moving image can be regarded as a plurality of still images that are arranged in time series. In addition, the subject may also freely change the facial expression or may also change the facial expression in accordance with a scenario that is determined in advance.

Furthermore, it is possible to determine the occurrence intensity of each of the AUs on the basis of an amount of movement of the respective markers. Specifically, the facial expression recognition model generation unit 43 is able to determine the occurrence intensity on the basis of an amount of movement of a marker calculated on the basis of the distance between a position that is set in advance as a determination criterion and each of the positions of the markers.

In the following, the movement of the markers will be described with reference to FIG. 14. FIG. 14 is a diagram illustrating the movement of the markers. The diagrams indicated by (a), (b), and (c) illustrated in FIG. 14 are images that are captured by the RGB camera 25*a*. Furthermore, it is assumed that the images indicated by (a), (b), and (c) are captured in this order. For example, (a) indicates an image when the subject has no facial expression. The facial expression recognition model generation unit 43 is able to regard the positions of the markers in the image indicated by (a) as reference positions in each of which an amount of movement is zero. As illustrated in FIG. 14, the subject has a facial expression of pulling the eyebrows together. At this time, the position of the marker 401 is moved in the downward direction in accordance with the change in the facial expression. At this time, the distance between the position of the marker 401 and each of the reference point markers that are attached to the instrument 25*c* is increased.

In this way, the facial expression recognition model generation unit 43 specifies the image data in which a certain facial expression of the subject is captured and the intensity of each of the markers at that time of the facial expression, and generates training data with an explanatory variable of "image data" and an objective variable of "an intensity of each of the markers". Then, the facial expression recognition model generation unit 43 generates the facial expression recognition model 25 by performing supervised learning using the generated training data. For example, the facial expression recognition model 25 is a neural network. The facial expression recognition model generation unit 43 changes a parameter of the neural network by performing machine learning on the facial expression recognition model 25. The facial expression recognition model 25 inputs the explanatory variable to the neural network. Then, the facial expression recognition model 25 generates a machine learning model in which a parameter of the neural network is changed such that an error between an output result that is output from the neural network and the correct answer data that is the objective variable is reduced.

Furthermore, generation of the facial expression recognition model 25 is only one example and it may be possible to use another method. In addition, it may also be possible to use, as the facial expression recognition model 25, behavior recognition that is disclosed in Japanese Laid-open Patent Publication No. 2021-111114.

Generation of Higher-Level Behavior Specific Rule 27

A description will be given here by referring back to FIG. 4. The rule generation unit 44 is a processing unit that generates the higher-level behavior specific rule 27 by using a past history or the like. Specifically, the rule generation unit 44 generates the higher-level behavior specific rule 27 by specifying, from various kinds of past video image data, a transition of motions and facial expressions occurring before a person performs a certain behavior.

Figure 15:
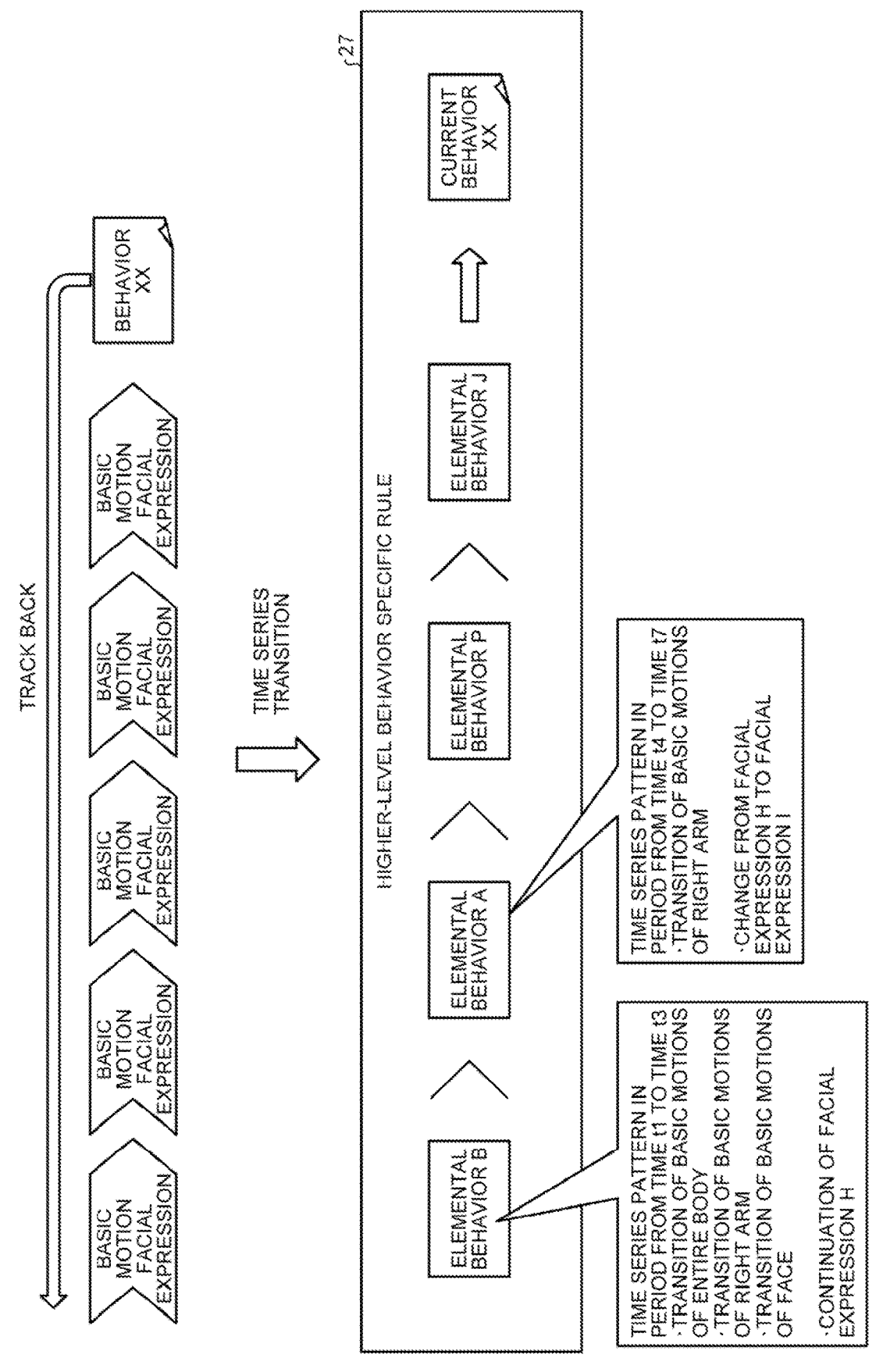
FIG. 15 is a diagram illustrating an example of generation of a higher-level behavior specific rule.

FIG. 15 is a diagram illustrating an example of generation of the higher-level behavior specific rule. As illustrated in FIG. 15, the rule generation unit 44 extracts a plurality of pieces of past image data that are retroactively acquired in a predetermined period of time starting from the image data in which a certain behavior XX is performed. Then, regarding each of the pieces of past image data that are retroactively acquired, the rule generation unit 44 detects basic motions and facial expressions by using a trained model, an image analysis, or the like.

After that, the rule generation unit 44 specifies a transition of the elemental behaviors (a transition of the basic motions and a transition of the facial expressions) that are detected during a period of time before the behavior XX is performed. For example, the rule generation unit 44 specifies, as the elemental behavior B, "a transition of the basic motions of the entire body, a transition of the basic motions of the right arm, and a transition of the basic motions of the face in the period of time from time t1 to t3" and "continuation of the facial expression H in the period of time from time t1 to t3". Furthermore, the rule generation unit 44 specifies, as the elemental behavior A, "a transition of the basic motions of the right arm and a change from the facial expression H to the facial expression I in a period of time from time t4 to t7".

In this way, the rule generation unit 44 sequentially specifies, as a transition of the elemental behaviors that are performed during a period of time before the behavior XX is performed, the elemental behavior B, the elemental behavior A, the elemental behavior P, and the elemental behavior J in this order. Then, the rule generation unit 44 generates the higher-level behavior specific rule 27 in which the "behavior XX" is associated with a "transition from the elemental behavior B, toward the elemental behavior A, the elemental behavior P, and the elemental behavior J", and then, stores the higher-level behavior specific rule 27 in the storage unit 20.

Furthermore, generation of the higher-level behavior specific rule 27 is only one example, and it may be possible to use another method or it may be possible to manually generate the higher-level behavior specific rule 27 by an administrator or the like.

Generation of Probability Model 28

Figure 16:
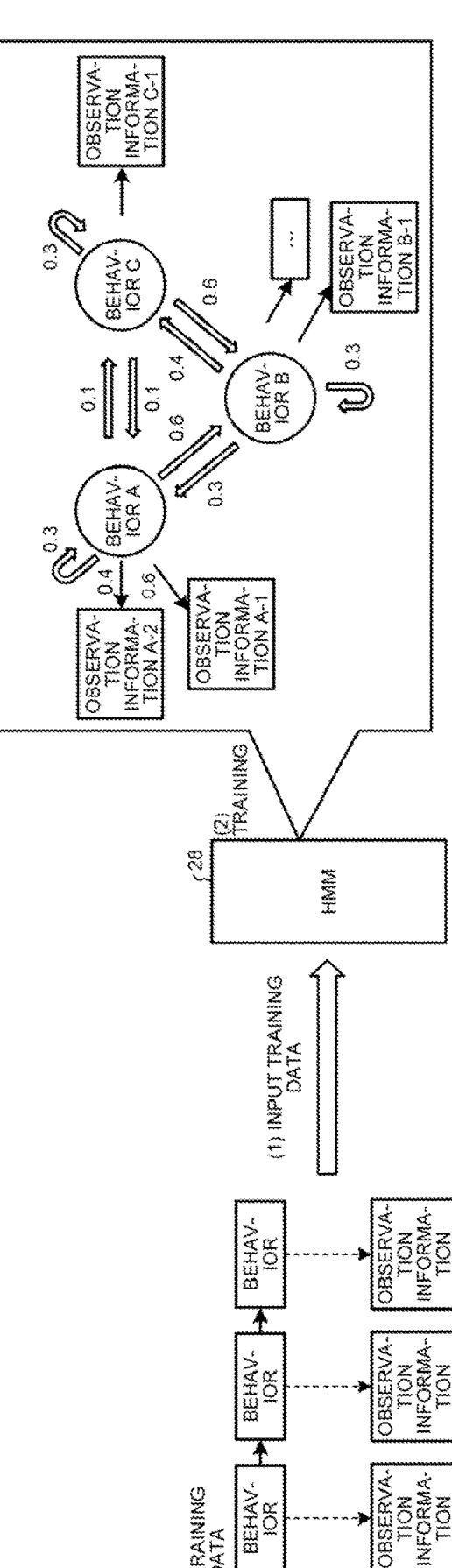
FIG. 16 is a diagram illustrating an example of generation of a probability model.

The probability model generation unit 45 is a processing unit that generates the probability model 28 by using the training data that is generated by collecting past events, past experiences, or the like. FIG. 16 is a diagram illustrating an example of generation of the probability model 28. As illustrated in FIG. 16, the probability model generation unit 45 uses the training data that is the time series data constituted of a combination of a certain "behavior" and "observation information" indicated at the time of occurrence of the certain behavior (see (1) in FIG. 16), and trains various probabilities of the hidden Markov model (HMM) (see (2) in FIG. 16).

For example, the probability model generation unit 45 trains the HMM by updating, by using the training data, the probability distribution obtained from the observation information that indicates a transition probability, which is related to a behavior and probabilistically exhibits a state transition indicating a behavior that is likely to be exhibited after a certain behavior, a feature value (a combination of skeleton information and a facial expression or a current behavior) of the person that is included in the video image data, and a relationship.

Furthermore, it is possible to use various known methods for the training method. In addition, the probability model 28 is able to use not only the HMM but also various models that are able to predict a potential state from the information that is able to be observed.

Operation Processing Unit 50

A description will be given here by referring back to FIG. 4. The operation processing unit 50 is a processing unit that includes an acquisition unit 51, a relationship specifying unit 52, a behavior specifying unit 53, and a behavior prediction unit 54, and that performs a behavior prediction process for predicting a future behavior of a person who appears in the video image data by using each of the models and each of the rules that are prepared by the pre-processing unit 40 in advance.

The acquisition unit 51 is a processing unit that acquires video image data from each of the cameras 2 and that stores the video image data in the video image data DB 21. For example, the acquisition unit 51 may acquire the video image data from each of the cameras 2 at any time or at periodic intervals.

Specifying Relationship

The relationship specifying unit 52 is a processing unit that performs a relationship specifying process for specifying a relationship between a person and another person who appear in the video image data or a relationship between a person and an object that appear in the video image data in accordance with the scene graph stored in the graph data DB 23. Specifically, the relationship specifying unit 52 specifies, for each frame included in the video image data, a type of a person or a type of an object that appears in the frame, and specifies a relationship by searching the scene graph by using each of the pieces of specified information. Then, the relationship specifying unit 52 outputs the specified relationship to the behavior prediction unit 54.

FIG. 17 is a diagram illustrating a process for specifying a relationship. As illustrated in FIG. 17, regarding a frame 1, the relationship specifying unit 52 specifies a type of a person, a type of an object, the number of persons, or the like included in the frame 1 on the basis of a result that is obtained by inputting the frame 1 to a machine learning model that has been subjected to machine learning or on the basis of a known image analysis performed on the frame 1. For example, the relationship specifying unit 52 specifies a "person (customer)" and a "person (store clerk)" as the type of each of the persons. After that, the relationship specifying unit 52 specifies, in accordance with the scene graph, a relationship of "the store clerk talks with the customer" between the node of the "person" having the attribute of the "customer" and the node of the "person" having the attribute of the "store clerk". The relationship specifying unit 52 also specifies a relationship of "talk", relationship of "hand over", or the like for each frame by similarly performing the above described relationship specifying process on each of the subsequent frames, such as a frame 2 or a frame 3.

Specifying Current Behavior

The behavior specifying unit 53 is a processing unit that specifies a current behavior of a person from the video image data. Specifically, regarding each of the frames included in the video image data, the behavior specifying unit 53 acquires the skeleton information on each of the parts of a person by using the skeleton recognition model 24 and specifies a facial expression of the person by using the facial expression recognition model 25. Then, the behavior specifying unit 53 specifies a behavior of the person by using the skeleton information on each of the parts of the person that is specified with respect to each of the frames and the facial expression of the person, and outputs the specified skeleton information and the facial expression to the behavior prediction unit 54.

Figure 18:
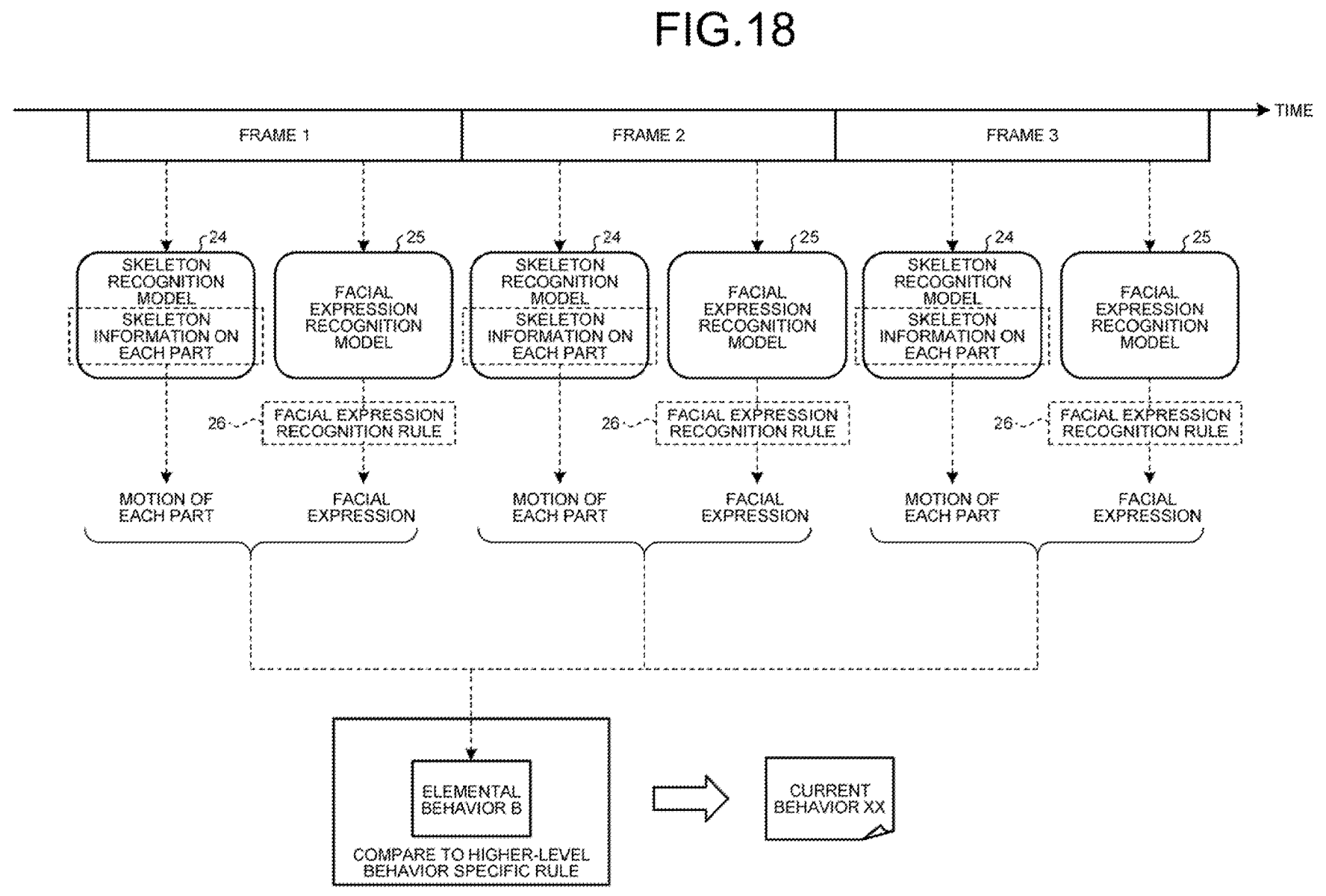

FIG. 18 is a diagram illustrating a specific example of a process for specifying a current behavior of a person. As illustrated in FIG. 18, the behavior specifying unit 53 inputs the frame 1 that is image data to the skeleton recognition model 24 and the facial expression recognition model 25. The skeleton recognition model 24 generates skeleton information on each of the parts in accordance with the input of the frame 1, and outputs a motion of each of the parts in accordance with the skeleton information on each of the parts. For example, by using the skeleton recognition model 24, the behavior specifying unit 53 is able to acquire the motion information on each of the parts, such as "face: facing front, arm: raise, leg: walk, . . . ", or the like. Furthermore, the facial expression recognition model 25 outputs, in accordance with an input of the frame 1, as the facial expression recognition result, each of the occurrence intensities of "AU 1: 2, AU 2: 5, AU 4: 1," of the respective AUs from the AU 1 to the AU 28. Then, the behavior specifying unit 53 checks the facial expression recognition result against the facial expression recognition rule 26, and specifies that the facial expression is "smile", or the like.

The behavior specifying unit 53 performs the above described specifying process on each of the subsequent frames, such as the frame 2 and the frame 3, and specifies, for each of the frames, the motion information on each of the parts of the person and the facial expression of the person who appears in the frame.

Then, the behavior specifying unit 53 performs the above described specifying process on each of the frames, so that the behavior specifying unit 53 specifies a transition of the motions of the respective parts of the person and a transition of the facial expressions. After that, the behavior specifying unit 53 compares the transition of the motions of the respective parts of the person and the transition of the facial expressions to each of the elemental behaviors in the higher-level behavior specific rule 27, and specifies the elemental behavior B.

Furthermore, the behavior specifying unit 53 specifies a transition of the elemental behaviors by repeatedly performing the process for specifying the elemental behavior from the video image data. Then, the behavior specifying unit 53 compares the transition of the elemental behaviors in the higher-level behavior specific rule 27, so that the behavior specifying unit 53 is able to specify the current behavior XX of the person appearing in the video image data.

Furthermore, in the example illustrated in FIG. 18, a case has been described as an example in which, regarding each of the frames, both of the motion of each of the parts and the facial expression are specified; however, the example is not limited to this. For example, the facial expression of the person is affected by a change in an internal state of the person, and thus, the facial expression exhibited at the time of a certain behavior does not always coincide with a facial expression that represents the internal state at the time of the behavior. In other words, if the facial expression is changed after a certain behavior is performed, the facial expression is sometimes changed before and after the certain behavior, which is a common case. Accordingly, the behavior specifying unit 53 is able to specify a facial expression by using a frame that is different from the frame that has been used to specify the motion of each of the parts.

Figure 19:
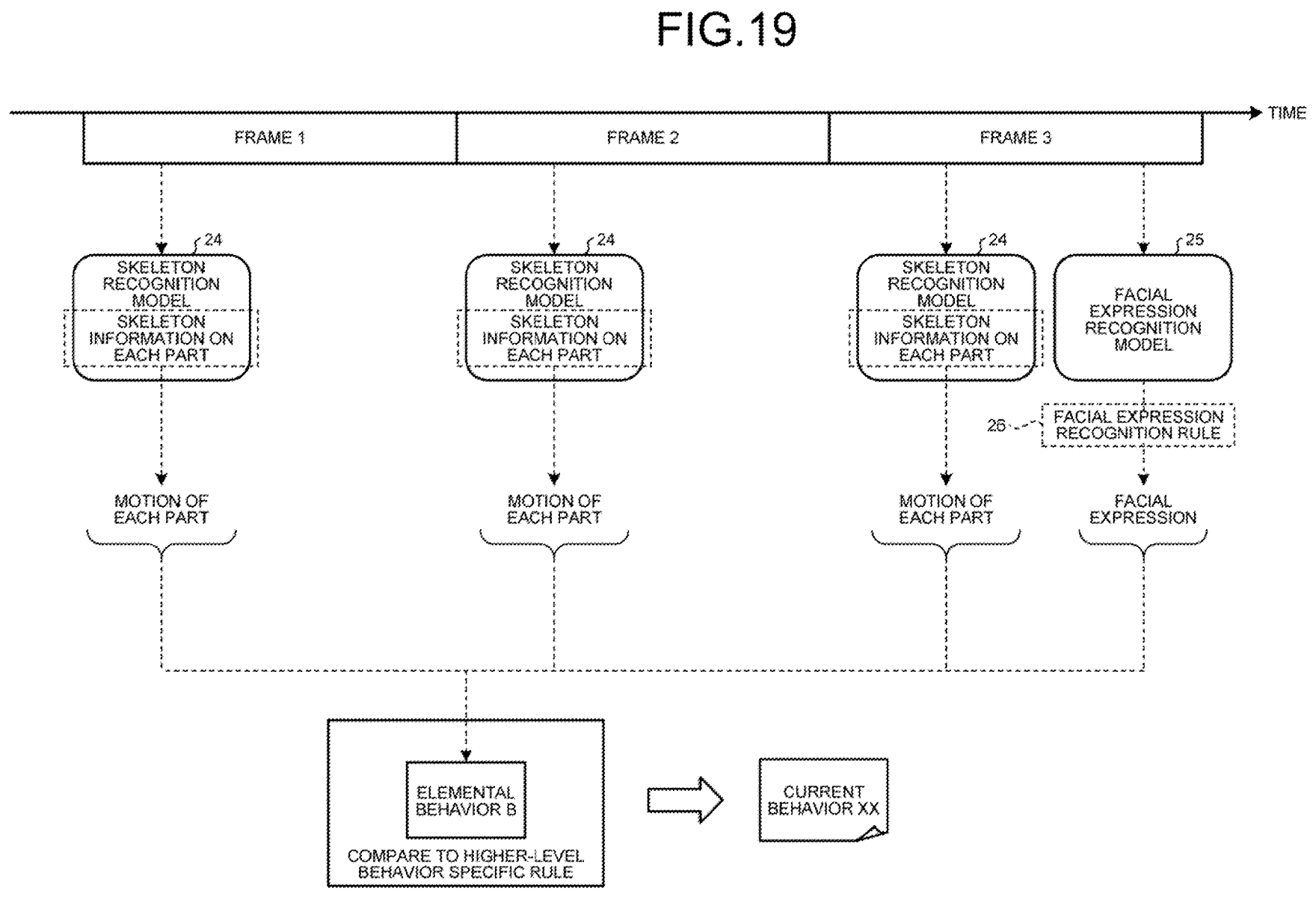

FIG. 19 is a diagram illustrating another example of a process for specifying a current behavior of a person. In FIG. 19, an example will be described in which a process for specifying a motion is performed in in each of the frames by using the frame 1, the frame 2, and the frame 3 as a single unit of process, and facial expression recognition is performed in the latest frame (the frame 3 in this example). As illustrated in FIG. 19, similarly to FIG. 18, the behavior specifying unit 53 performs skeleton recognition by using the skeleton recognition model 24 on the frame 1, the frame 2, and the frame 3, and specifies the motion of each of the parts for each of the frames. In contrast, the behavior specifying unit 53 inputs the frame 3 to the facial expression recognition model 25 and specifies the facial expression of the person.

After that, similarly to FIG. 18, the behavior specifying unit 53 specifies the elemental behavior and specifies the current behavior. Furthermore, the examples described above are only examples, and thus, the behavior specifying unit 53 may specify the motion of each of the parts for each of the frames, and performs facial expression recognition by using the first frame. Furthermore, the behavior specifying unit 53 may specify the motion by using each of the frames, whereas the behavior specifying unit 53 may specify, regarding the facial expression recognition, the facial expressions that occurs among the frames or transition of the facial expressions by using a plurality of frames (the frame 1 to the frame 3 in FIG. 19).

Prediction of Future Behavior

The behavior prediction unit 54 is a processing unit that performs future behavior prediction on a behavior of a person by using the current behavior of the person and the relationship. Specifically, the behavior prediction unit 54 inputs, to the probability model 28, the relationship that is specified by the relationship specifying unit 52 and the current behavior that is exhibited by the person and that is specified by the behavior specifying unit 53, and then, predicts a future behavior of the person. Then, the behavior prediction unit 54 transmits the prediction result to a terminal for an administrator or displays the prediction result on a display or the like.

Figure 20:
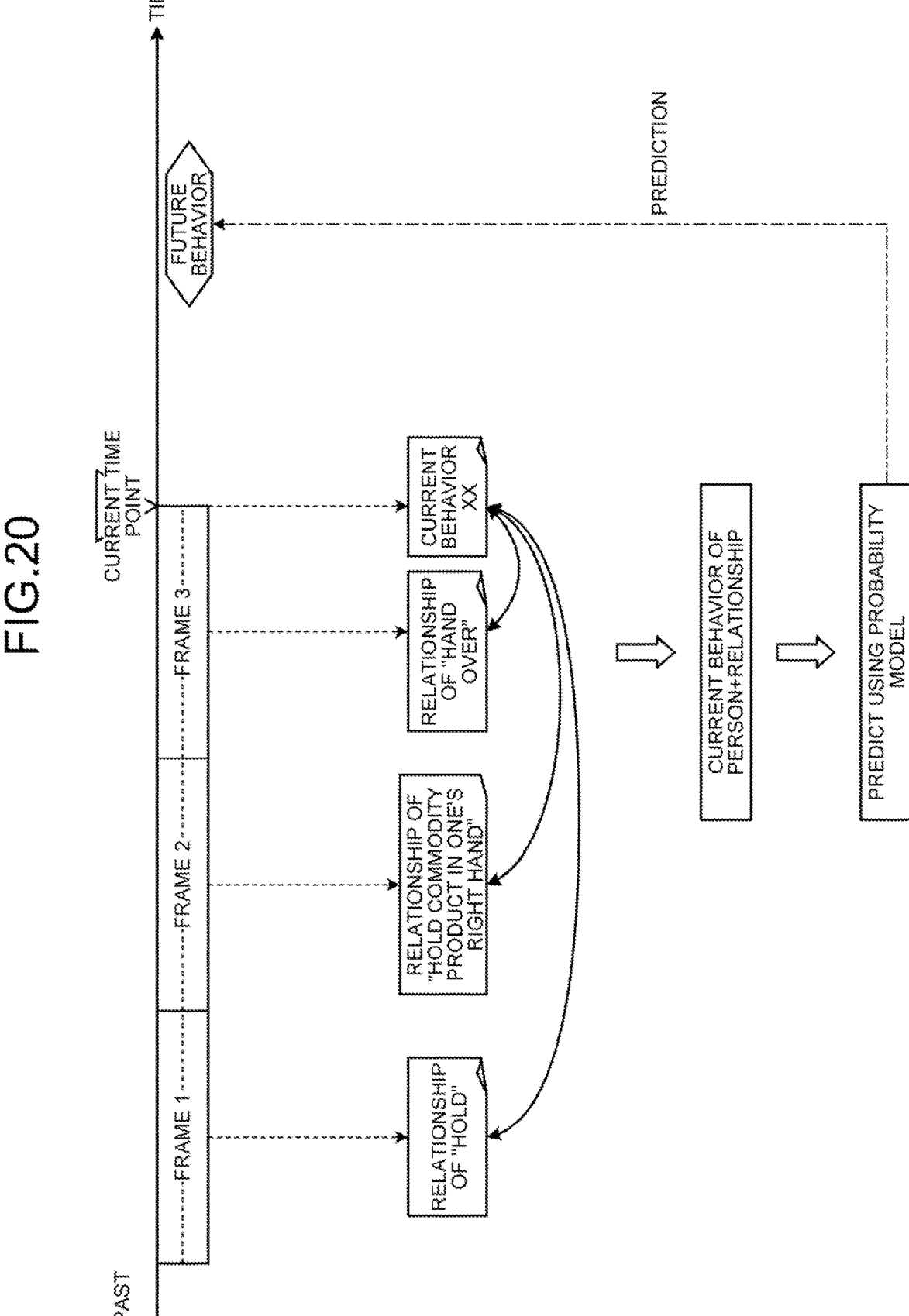
FIG. 20 is a diagram illustrating behavior prediction performed on a person.

FIG. 20 is a diagram illustrating behavior prediction performed on a person. As illustrated in FIG. 20, the behavior prediction unit 54 acquires, at a point of time of the frame 1, a relationship "hold" that is specified at that point of time; at a point of time of the frame 2, a relationship of "hold a commodity product in right hand" that is specified at that point of time; and, at a point of time of the frame 3, the relationship "hold" that is specified at that point of time and the current behavior XX. Then, the behavior prediction unit 54 predicts a behavior of the person by inputting the latest relationship and the current behavior XX to the probability model 28 (HMM).

Figure 21:
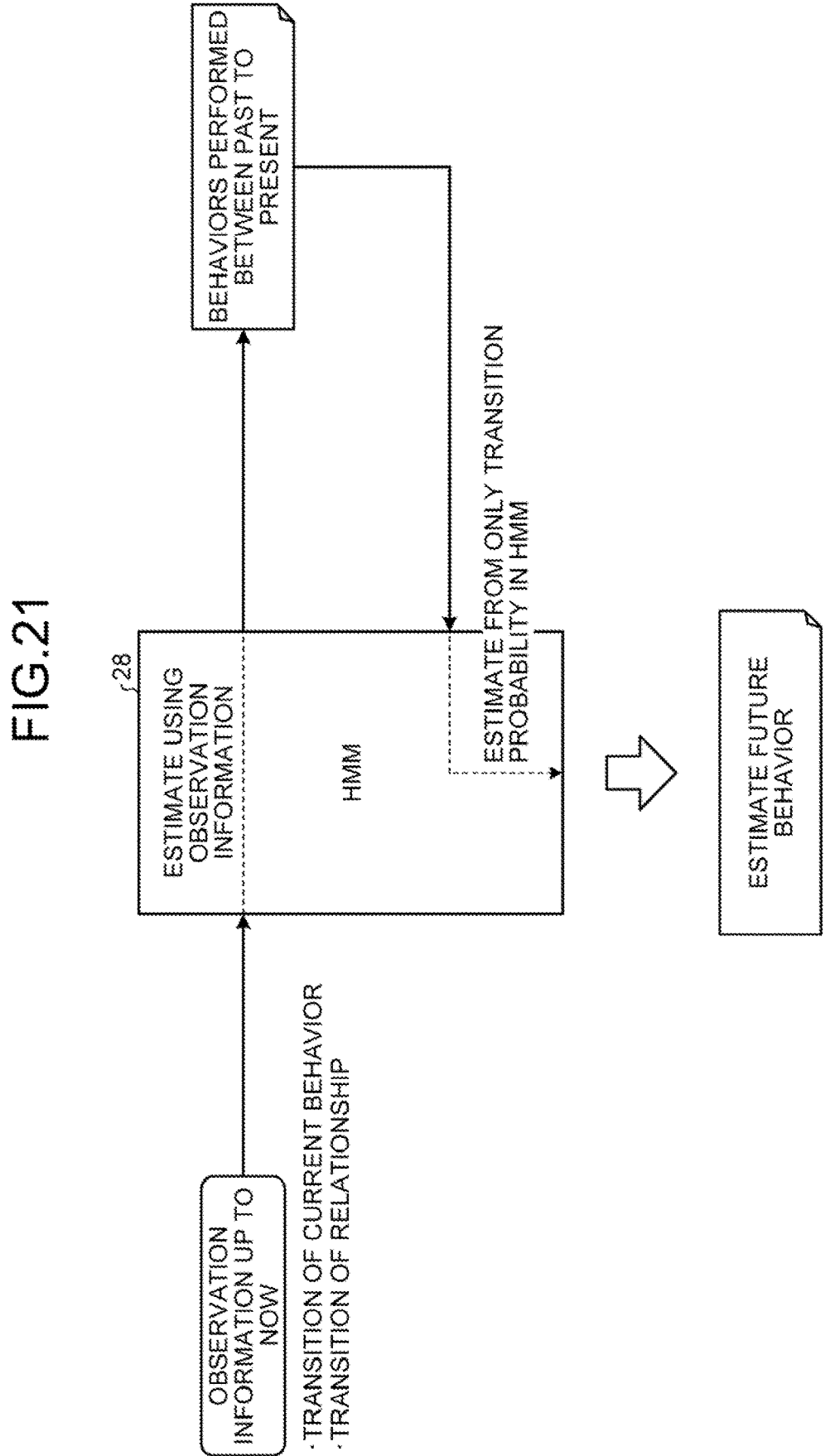
FIG. 21 is a diagram illustrating behavior prediction performed on a person using the probability model.

FIG. 21 is a diagram illustrating behavior prediction performed on a person by using the probability model 28. As illustrated in FIG. 21, the behavior prediction unit 54 inputs, to the HMM, the observation information that includes a transition of the behaviors and a transition of the relationships obtained up to the current, and estimates a "behavior". Then, the behavior prediction unit 54 specifies, in accordance with the transition probability of each of the states in the probability model 28, the "behavior" with the highest transition probability among the transition probabilities of the estimated "behavior", and then, predicts the specified "behavior" as the future behavior of the person.

Specifically, if the observation information indicating that "a person holds a screwdriver" is obtained at the current time, the behavior prediction unit 54 estimates a behavior of "the person picking up the screwdriver" as the behavior exhibited at the current time by inputting, to the HMM, the pieces of observation information that are obtained during a period of time between the past and the present. After that, the behavior prediction unit 54 specifies, in accordance with only each of the transition probabilities in the HMM, among the transition probabilities of the behaviors exhibited between the current behavior of "the person picking up the screwdriver" and another behavior, the behavior of "the person tightening up a screw" that is the highest transition probability. As a result, the behavior prediction unit 54 predicts the behavior of "the person tightening up a screw" as a future behavior after a certain period of time.

Furthermore, it may be possible to use, for the observation information illustrated in FIG. 21, not only the transition of the pieces of observation information but also the latest observation information (current behavior and a relationship). In addition, instead of the current behavior, it may be possible to use, for the observation information, a "combination of the skeleton information and the facial expression". One of the two pieces of information is determined to be used on the basis of a configuration of the HMM (training content).

Furthermore, in FIG. 20, a case has been described as an example in which the behavior prediction unit 54 performs behavior prediction by using the current behavior and the latest facial expression; however, the example is not limited to this. As described above, the facial expression of a person is largely affected by a change in the internal state of the person, so that the latest behavior does not always represent the current facial expression. Therefore, as illustrated in FIG. 20, the behavior prediction unit 54 may perform behavior prediction by using the current behavior that is specified from the latest frame 3 and at least one of relationships that are recognized up to the frame 3 or a change in the relationships from the frame 1 to the frame 3.

At this time, if the current behavior is specified by a first frame that is one example of the image data at a certain time, and if the relationship is specified by a second frame, the behavior prediction unit 54 determines whether or not a second frame is detected in a certain range corresponding to a certain number of frames or a certain period of time that is set in advance from the point of time at which the first frame is detected. Then, if it is determined, by the behavior prediction unit 54, that the second frame is detected in the certain range that is set in advance, the behavior prediction unit 54 predicts a future behavior or a future state of the person on the basis of the behavior of the person included in the first frame and the relationship included in the second frame.

In other words, the behavior prediction unit 54 predicts a future behavior or a future state of the person by using the current behavior and the relationship that are detected at certain timings that are close with each other to some extent. Furthermore, the range that is set in advance may be arbitrarily set, and either of the current behavior and the relationship may be specified first.

Flow of Process

Figure 22:
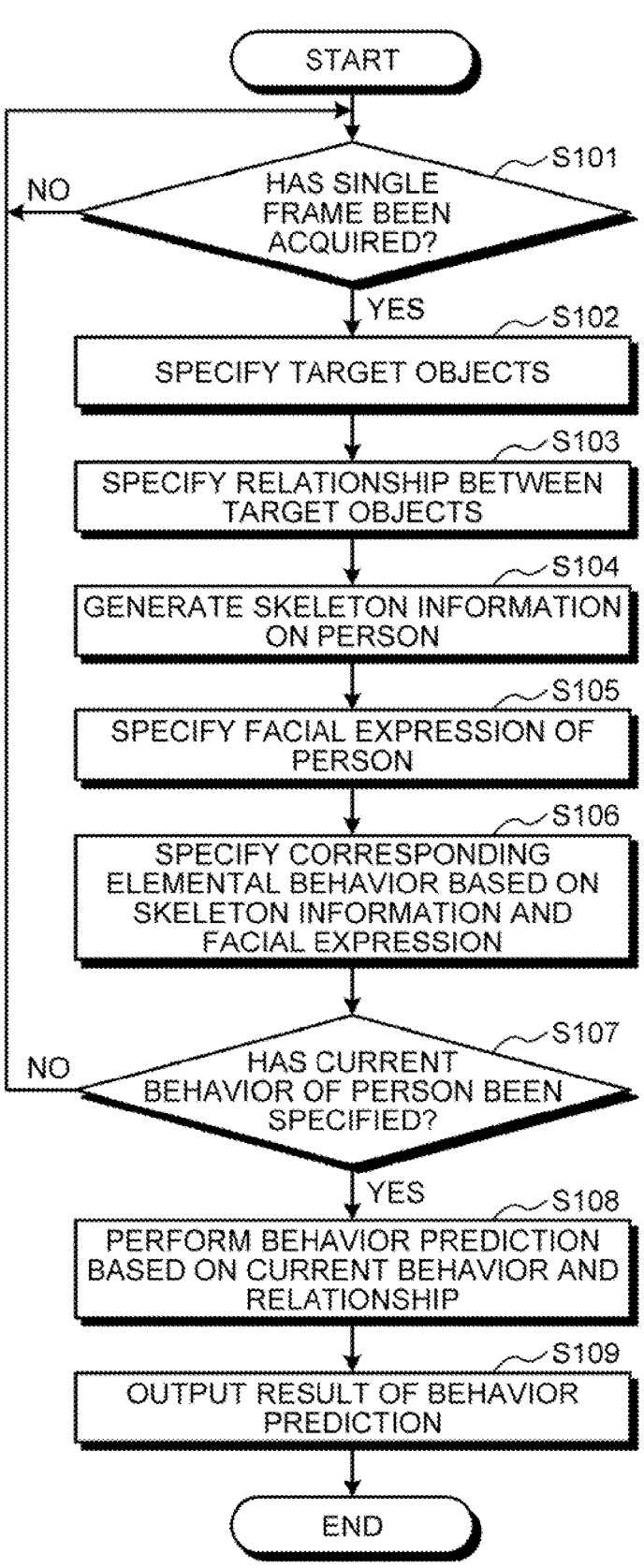
FIG. 22 is a flowchart illustrating the flow of a behavior prediction process.

FIG. 22 is a flowchart illustrating the flow of the behavior prediction process. Furthermore, in this process, it is assumed that pre-processing has already been completed. As illustrated in FIG. 22, if the operation processing unit 50 acquires a single frame (Yes at Step S101), the operation processing unit 50 specifies a target object that appears in the frame by performing an image analysis or the like (Step S102). Subsequently, the operation processing unit 50 searches the scene graph stored in the graph data DB 23 by using the specified target object, and specifies a relationship of the target object (Step S103).

Then, the operation processing unit 50 inputs the frame to the skeleton recognition model 24, and acquires the skeleton information that is related to the person and that indicates a motion of, for example, each of the parts (Step S104). Furthermore, if a person does not appear in the frame at Step S103, the operation processing unit 50 omits the process at Step S104.

Furthermore, the operation processing unit 50 inputs the frame to the facial expression recognition model 25, and specifies a facial expression of the person from the output result and the facial expression recognition rule 26 (Step S105). In addition, if a person does not appear in the frame at Step S103, the operation processing unit 50 omits the process at Step S105.

After that, the operation processing unit 50 specifies a corresponding elemental behavior from the higher-level behavior specific rule 27 by using the skeleton information on the person and the facial expression of the person (Step S106). At this time, if the current behavior of the person is not specified (No at Step S107), the operation processing unit 50 repeats the process at Step S101 and the subsequent process to be performed on a next frame.

In contrast, if the current behavior of the person is specified (Yes at Step S107), the operation processing unit 50 inputs the current behavior and the specified relationship to the probability model 28, and predicts a future behavior of the person (Step S108). After that, the operation processing unit 50 outputs a result of the behavior prediction (Step S109).

Specific Examples

In the following, specific example of solutions that contribute to achievement of a safe and secure society produced by using the behavior prediction performed by the information processing apparatus 10 described above will be described. Here, a solution that uses a relationship between a person and an object and a solution that uses a relationship between a person and another person will be described.

Solution that Uses Relationship Between Person and Object

Figure 23:
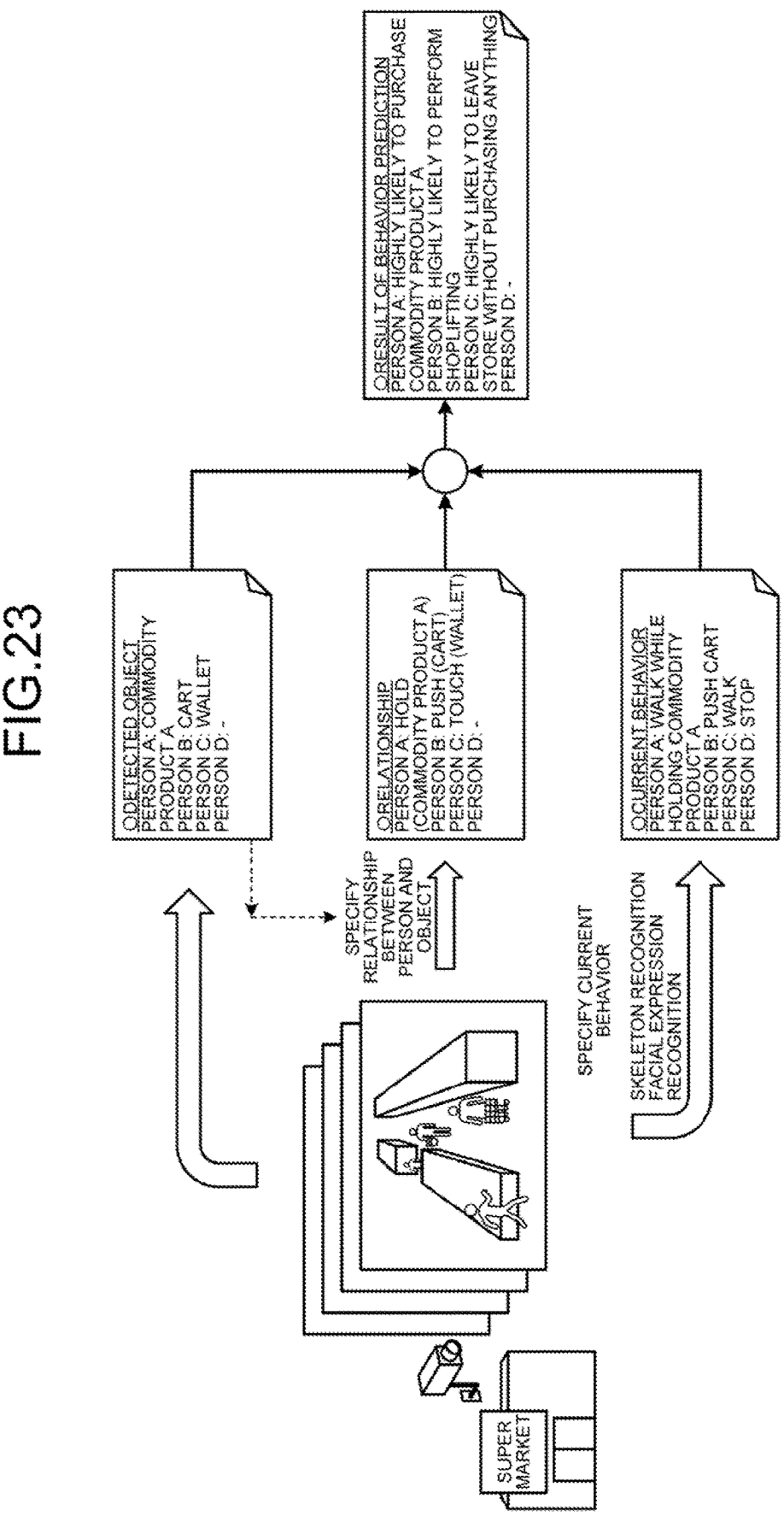
FIG. 23 is a diagram illustrating an example of a solution to which behavior prediction related to a person and an objected is applied.

FIG. 23 is a diagram illustrating an example of a solution to which the behavior prediction related to a person and an object is applied. In FIG. 23, an example of a behavior prediction performed by using video image data that is captured by a monitoring camera installed in a supermarket or the like will be described. Furthermore, the processes described below are performed on a single frame or performed across a plurality of frames included in a single piece of video image data.

As illustrated in FIG. 23, the information processing apparatus 10 detects, from a frame included in the video image data, a combination of the person A and the commodity product A, a combination of a person B and a cart, a combination of a person C and a wallet, and a person D. Then, the information processing apparatus 10 uses the detection result and the scene graph, and specifies "a relationship of "hold" of the person A with respect to the commodity product A", "a relationship of "push" of the person B with respect to the cart", and "a relationship of "touch" of the person C with respect to the wallet". Here, regarding the person D, an object is not detected, so that a relationship is not specified.

Furthermore, the information processing apparatus 10 performs skeleton recognition by using the skeleton recognition model 24, performs facial expression recognition by using the facial expression recognition model 25, and then, specifies, by using the recognition results thereof, the current behavior of the person A "holding the commodity product A", the current behavior of the person B "pushing the cart", the current behavior of the person C "walking", and the current behavior of the person D "stopping".

Then, the information processing apparatus 10 performs behavior prediction by using the current behaviors and the relationships, and predicts a future behavior of the person A indicating that the person A is "highly likely to purchase the commodity product A", a future behavior of the person B indicating that the person B is "highly likely to perform shoplifting", and a future behavior of the person C indicating that the person C is "highly likely to leave the store without purchasing anything". Here, the relationship is not specified for the person D, so that the person D is excluded from the target of the behavior prediction.

In other words, the information processing apparatus 10 specifies a customer who moves in an area of a commodity product shelf that is a predetermined area of the video image data, specifies a target commodity product to be purchased by the customer, specifies, as the relationship, a type of a behavior (for example, watching, holding, etc.) of the customer exhibited with respect to the commodity product, and predicts a behavior (for example, purchasing, shoplifting, etc.) related to the purchase of the commodity product exhibited by the customer.

In this way, the information processing apparatus 10 is able to make good use of the above described behavior prediction for an analysis of a purchase behavior, such as a behavior or a route that leads to a purchase, a purchase marketing, or the like. Furthermore, the information processing apparatus 10 is able to detect a person, such as the person B, who is likely to commit a crime of, for example, shoplifting and is able to make good use of preventing a crime by strengthening surveillance of the person.

Solution that Uses Relationship Between Person and Another Person

FIG. 24 is a diagram illustrating an example of a solution to which behavior prediction related to a person and another person is applied. In FIG. 24, an example of the behavior prediction performed by using the video image data that is captured at night by a monitoring camera installed on a street will be described. Furthermore, the processes described below are performed on a single frame or performed across a plurality of frames included in a single piece of video image data.

As illustrated in FIG. 24, the information processing apparatus 10 detects, from a frame included in the video image data, the person A (female: 20s) and the person B (male: 40s). Then, the information processing apparatus 10 uses the detection result and the scene graph, and specifies "a relationship of "close" to the person A with respect to the person B" and "a relationship of "stalking" of the person B with respect to the person A".

Furthermore, the information processing apparatus 10 performs skeleton recognition by using the skeleton recognition model 24, performs facial expression recognition by using the facial expression recognition model 25, and specifies, by using the recognition results thereof, the current behavior of the person A "walking ahead of the person B" and the current behavior of the person B "hiding away".

Then, the information processing apparatus 10 predicts, on the basis of the behavior prediction performed by using the current behavior and the relationship, a future behavior of the person A indicating that the person A is "highly likely to be attacked by the person B", and the future behavior of the person B indicating that the person B is "highly likely to attack the person A".

In other words, the information processing apparatus 10 is able to predict a criminal act of the person B performed with respect to the person A by assuming that the person A is a victim, the person B is a committer, on the basis of the relationship of "stalking" of the committer with respect to the victim. As a result, the information processing apparatus 10 is able to detect a location where a crime is likely to be committed on the basis of a result of the above described behavior prediction, and implement a preventive measure, such as calling the police or the like. Furthermore, it is possible to make good use of examination of countermeasures, such as an increase in street lights.

Effects

As described above, the information processing apparatus 10 is able to predict a sign, instead of an occurrence of an accident or a crime, so that the information processing apparatus 10 is able to detect, from the video image data, a situation in which a countermeasure is needed in advance. Furthermore, the information processing apparatus 10 is able to perform behavior prediction from the video image data that is captured by a commonly used camera, such as a monitoring camera, so that the information processing apparatus 10 may be introduced into an existing system without a need of a complicated system configuration of a new device. In addition, the information processing apparatus 10 is introduced into an existing system, so that it is possible to reduce a cost as compared to a case in which a new system is constructed. Furthermore, the information processing apparatus 10 is able to predict not only simple behaviors that are continued from the past and current behaviors but also complicated behaviors of a person that are not able to simply specify from the past and current behaviors. As a result, the information processing apparatus 10 is able to improve prediction accuracy of a future behavior of a person.

Furthermore, the information processing apparatus 10 is able to implement the behavior prediction by using two-dimensional image data without using three-dimensional image data, so that it is possible to increase a speed of a process as compared to a process performed by using a laser sensor or the like that is recently used. In addition, the information processing apparatus 10 is able to rapidly detect, with a high-speed process, a situation in which a countermeasure is needed in advance.

[b] Second Embodiment

In the above explanation, a description has been given of the embodiments according to the present invention; however, the present invention may also be implemented with various kinds of embodiments other than the embodiments described above.

Numerical Value, Etc.

Examples of the numerical values, the number of cameras, the label names, examples of the rules, examples of the behaviors, examples of the states, and the like used in the embodiment described above are only examples and may be arbitrarily changed. Furthermore, the flow of the processes described in each of the flowcharts may be changed as long as the processes do not conflict with each other. In addition, in the embodiment described above, the store is used as an example for the explanation; however, the example is not limited to this and may be applied to, for example, a warehouse, a factory, a classroom, the inside of a train, a passenger cabin of an airplane, or the like.

Example of Scene Graph

Furthermore, in the embodiment described above, a case has been described as an example in which a process for generating a single scene graph that includes a plurality of relationships and a process for specifying a relationship by using the scene graph; however, the example is not limited to this. For example, the information processing apparatus 10 is also able to generate a single scene graph related to a single relationship. In other words, the information processing apparatus 10 may generate a single scene graph that includes N relationships (N is a numerical value equal to or larger than 1) or generate N scene graphs associated with N relationships, respectively, and may use the generated one or more scene graphs. If the N scene graphs are used, specifying a scene graph directly leads to specifying a relationship. In this case, the information processing apparatus 10 is able to specify a relationship by specifying, from a frame, a type of a person, a type of an object, the number of persons or the like included in the frame and specifying a single scene graph that includes these pieces of specified information as an object or an attribute.

Furthermore, the information processing apparatus 10 may generate a scene graph for each frame. Here, a relationship between a frame included in video image data and a scene graph will be described with reference to FIG. 17. The graph generation unit 41 generates a scene graph for each of the plurality of frames. Then, the graph generation unit 41 generates a new scene graph that is obtained by integrating the scene graphs, which are generated for the respective frames, into a single scene graph. For example, the graph generation unit 41 specifies, in accordance with a type of an object or the like, that a node (object) 1 that is included in a scene graph 1 generated from the frame 1 and a node 2 that is included in a scene graph 2 generated from the frame 2 are the same nodes (objects). At this time, the graph generation unit 41 connects the node 1 in the scene graph 1 and a node 2 in the scene graph 2 by a link, and integrates the node 1 and the node 2 into a single node. As a result, the graph generation unit 41 generates a new scene graph in which the scene graph 1 and the scene graph 2 are connected. The graph generation unit 41 stores the new scene graph in the graph data DB 23. Furthermore, the graph generation unit 41 may generate a single scene graph from a single frame.

System

The flow of the processes, the control procedures, the specific names, and the information containing various kinds of data or parameters indicated in the above specification and drawings can be arbitrarily changed unless otherwise stated.

Furthermore, the components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

Furthermore, all or any part of each of the processing functions performed by the each of the devices can be implemented by a CPU and by programs analyzed and executed by the CPU or implemented as hardware by wired logic.

Hardware

Figure 25:
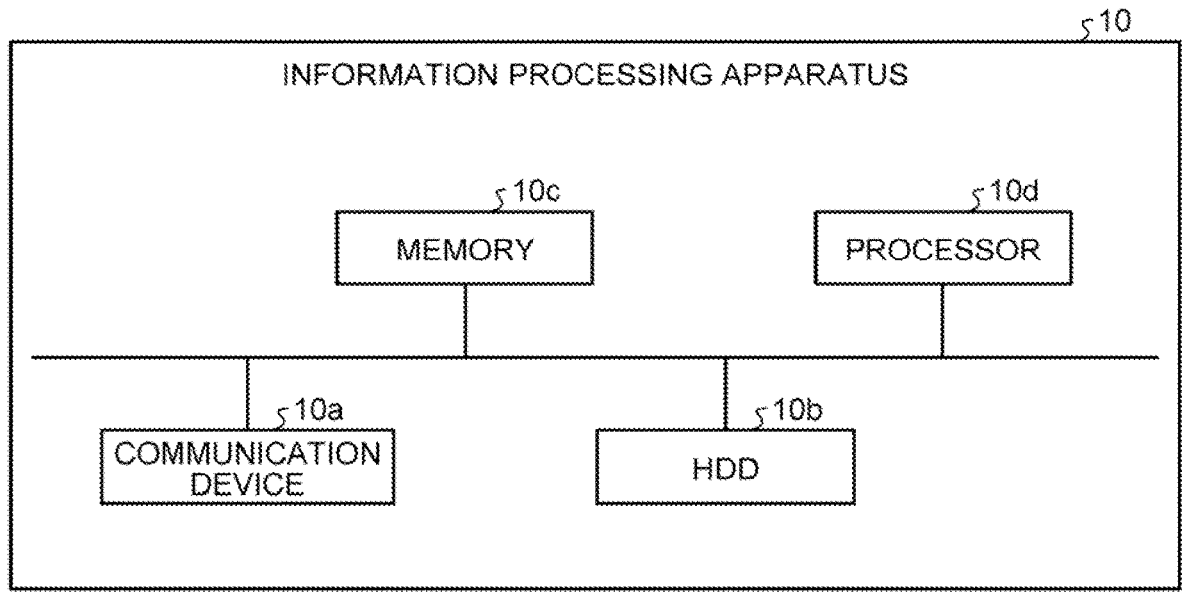
FIG. 25 is a diagram illustrating an example of a hardware configuration.

FIG. 25 is a diagram illustrating an example of a hardware configuration. As illustrated in FIG. 25, the information processing apparatus 10 includes a communication device 10*a*, a hard disk drive (HDD) 10*b*, a memory 10*c*, and a processor 10*d*. Furthermore, each of the units illustrated in FIG. 25 is connected by a bus or the like with each other.

The communication device 10*a* is a network interface card or the like and communicates with another device. The HDD 10*b* stores therein the programs and DBs that operate the functions illustrated in FIG. 4.

The processor 10*d* operates the process that executes each of the functions described above in FIG. 4 or the like by reading the programs that execute the same process as that performed by each of the processing units illustrated in FIG. 4 from the HDD 10*b* and loading the read programs in the memory 10*c*. For example, the process executes the same functions as those performed by each of the processing units included in the information processing apparatus 10. Specifically, the processor 10*d* reads, from the HDD 10*b* or the like, the programs having the same functions as those performed by the pre-processing unit 40, the operation processing unit 50, and the like. Then, the processor 10*d* executes the process for executing the same processes as those performed by the pre-processing unit 40, the operation processing unit 50, and the like.

In this way, the information processing apparatus 10 is operated as an information processing apparatus that performs a behavior prediction method by reading and executing the programs. Furthermore, the information processing apparatus 10 is also able to implement the same functions as those described above in the embodiment by reading the above described programs from a recording medium by a medium reading device and executing the read programs. Furthermore, the programs described in another embodiment are not limited to be executed by the information processing apparatus 10. For example, the above described embodiments may also be similarly used in a case in which another computer or a server executes a program or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

According to an aspect of one embodiment, it is possible to detect, from video image data, a situation in which a countermeasure is needed in advance.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:

acquiring video image data that includes target objects including a person and an object;

first specifying, by using graph data that defines a relationship between persons and/or a relationship between the person and the object, a relationship between each of the target objects included in the acquired video image data;

second specifying, by using a feature value including a facial expression and skeleton information indicating a joint position of the person included in the acquired video image data, transition of the skeleton information and facial expression information on the person from respective frames in the video data, and specifying transition of an elemental behavior associated with a basic action and the facial expression of the person from the specified transition of the skeleton information and the facial expression information on the person;

third specifying a current behavior of the person corresponding to the transition of the elemental behavior of the person specified in the video data, in accordance with a behavior identification rule associating the current behavior with the transition of the elemental behavior and predicting, by inputting the specified current behavior of the person and the specified relationship to a probability model, a future behavior of the person performing the specified current behavior including a feeling and a state affected by inner emotions of the person, wherein the probability model is a trained model that has learned i) a behavior transition probability as a probabilistic representation of a state transition indicating a possible future behavior after a certain behavior, and ii) a probability distribution obtained from observation information indicating the feature value and the relationship of the person in the video data.

2. The non-transitory computer-readable recording medium according to claim 1, wherein the specified current behavior of the person is included in a first frame among a plurality of frames that constitute the video image data, the specified relationship is included in a second frame among the plurality of frames that constitute the video image data, and the predicting includes determining whether or not the second frame is detected within a range of a number of frames or a period of time that is set in advance from a point of time at which the first frame is detected, and predicting the future behavior of the person based on the current behavior of the person included in the first frame and the relationship included in the second frame when it is determined that the second frame is detected within the range of the number of frames or the period of time that is set in advance.

3. The non-transitory computer-readable recording medium according to claim 1, wherein the first specifying includes specifying the person and the object that are included in the video image data, and specifying a relationship between the person and the object by searching the graph data using a type of the specified person and a type of the specified object.

4. The non-transitory computer-readable recording medium according to claim 1, wherein the third specifying includes acquiring a first machine learning model in which a parameter of a neural network is changed such that an error between an output result that is output from the neural network when an explanatory variable that is image data is input to the neural network and correct answer data that is a label of a motion is reduced, specifying the skeleton information on the person by inputting the video image data to the first machine learning model, acquiring a second machine learning model in which a parameter of a neural network is changed such that an error between an output result that is output from the neural network when an explanatory variable that is image data including a facial expression of the person is input to the neural network and correct answer data that indicates an objective variable that is an intensity of each of markers of respective facial expressions of the person is reduced, generating an intensity of each of the markers of the person by inputting the video image data to the second machine learning model, and specifying a facial expression of the person by using the generated intensity of each of the markers.

5. The non-transitory computer-readable recording medium according to claim 1, wherein the predicting includes estimating a behavior or a state by inputting the specified current behavior of the person and the specified relationship to the probability model, and predicting, as the future behavior of the person in accordance with the probability model, a behavior or a state with the highest probability of a state transition occurring from the estimated behavior or the estimated state.

6. The non-transitory computer-readable recording medium according to claim 3, wherein the person is a customer who moves in a predetermined area in the video image data, the object is a commodity product to be purchased by the customer, the relationship is a type of a behavior of the person exhibiting with respect to the commodity product, and the predicting includes predicting, as the future behavior of the person, a behavior related to a purchase of the commodity product exhibited by the customer.

7. The non-transitory computer-readable recording medium according to claim 1, wherein the first specifying includes specifying a first person and a second person who are included in the video image data, and specifying a relationship between the first person and the second person by searching the graph data by using a type of the first person and a type of the second person.

8. The non-transitory computer-readable recording medium according to claim 7, wherein the first person is a committer, the second person is a victim, the relationship is a type of a behavior of the first person exhibiting with respect to the second person, and the predicting includes predicting, as the future behavior of the person, a criminal act of the first person exhibiting with respect to the second person.

9. An information processing method executed by a computer, the information processing method comprising:

acquiring video image data that includes target objects including a person and an object;

specifying, by using graph data that defines a relationship between persons and/or a relationship between the person and the object, a relationship between each of the target objects included in the acquired video image data;

specifying, by using a feature value including a facial expression and skeleton information indicating a joint position of the person included in the acquired video image data, transition of the skeleton information and facial expression information on the person from respective frames in the video data, and specifying transition of an elemental behavior associated with a basic action and the facial expression of the person from the specified transition of the skeleton information and the facial expression information on the person;

specifying a current behavior of the person corresponding to the transition of the elemental behavior of the person specified in the video data, in accordance with a behavior identification rule associating the current behavior with the transition of the elemental behavior; and predicting, by inputting the specified current behavior of the person and the specified relationship to a probability model, a future behavior of the person performing the specified current behavior including a feeling and a state affected by inner emotions of the person, using a processor, wherein the probability model is a trained model that has learned i) a behavior transition probability as a probabilistic representation of a state transition indicating a possible future behavior after a certain behavior, and ii) a probability distribution obtained from observation information indicating the feature value and the relationship of the person in the video data.

10. An information processing apparatus comprising:

a memory; and a processor coupled to the memory and configured to:

acquire video image data that includes target objects including a person and an object;

specify, by using graph data that defines a relationship between persons and/or a relationship between the person and the object, a relationship between each of the target objects included in the acquired video image data;

specify, by using a feature value including a facial expression and skeleton information indicating a joint position of the person included in the acquired video image data, transition of the skeleton information and facial expression information on the person from respective frames in the video data, and specifying transition of an elemental behavior associated with a basic action and the facial expression of the person from the specified transition of the skeleton information and the facial expression information on the person;

specify a current behavior of the person corresponding to the transition of the elemental behavior of the person specified in the video data, in accordance with a behavior identification rule associating the current behavior with the transition of the elemental behavior; and predict, by inputting the specified current behavior of the person and the specified relationship to a probability model, a future behavior of the person performing the specified current behavior including a feeling and a state affected by inner emotions of the person, wherein the probability model is a trained model that has learned i) a behavior transition probability as a probabilistic representation of a state transition indicating a possible future behavior after a certain behavior, and ii) a probability distribution obtained from observation information indicating the feature value and the relationship of the person in the video data.

11. The information processing apparatus according to claim 10, wherein the specified current behavior of the person is included in a first frame among a plurality of frames that constitute the video image data, the specified relationship is included in a second frame among the plurality of frames that constitute the video image data, and the processor is configured to:

determine whether or not the second frame is detected within a range of a number of frames or a period of time that is set in advance from a point of time at which the first frame is detected, and predict the future behavior of the person based on the current behavior of the person included in the first frame and the relationship included in the second frame when it is determined that the second frame is detected within the range of the number of frames or the period of time that is set in advance.

12. The information processing apparatus according to claim 10, wherein processor is configured to:

specify the person and the object that are included in the video image data, and specify a relationship between the person and the object by searching the graph data using a type of the specified person and a type of the specified object.

13. The information processing apparatus according to claim 10, wherein processor is configured to:

acquire a first machine learning model in which a parameter of a neural network is changed such that an error between an output result that is output from the neural network when an explanatory variable that is image data is input to the neural network and correct answer data that is a label of a motion is reduced, specify the skeleton information on the person by inputting the video image data to the first machine learning model, acquire a second machine learning model in which a parameter of a neural network is changed such that an error between an output result that is output from the neural network when an explanatory variable that is image data including a facial expression of the person is input to the neural network and correct answer data that indicates an objective variable that is an intensity of each of markers of respective facial expressions of the person is reduced, generate an intensity of each of the markers of the person by inputting the video image data to the second machine learning model, and specify a facial expression of the person by using the generated intensity of each of the markers.

14. The information processing apparatus according to claim 10, wherein processor is configured to:

estimate a behavior or a state by inputting the specified current behavior of the person and the specified relationship to the probability model, and predict, as the future behavior of the person in accordance with the probability model, a behavior or a state with the highest probability of a state transition occurring from the estimated behavior or the estimated state.

15. The information processing apparatus according to claim 12, wherein the person is a customer who moves in a predetermined area in the video image data, the object is a commodity product to be purchased by the customer, the relationship is a type of a behavior of the person exhibiting with respect to the commodity product, and the predicting includes predicting, as the future behavior of the person, a behavior related to a purchase of the commodity product exhibited by the customer.

16. The information processing apparatus according to claim 10, wherein processor is configured to:

specify a first person and a second person who are included in the video image data, and specify a relationship between the first person and the second person by searching the graph data by using a type of the first person and a type of the second person.

17. The information processing apparatus according to claim 10, wherein the first person is a committer, the second person is a victim, the relationship is a type of a behavior of the first person exhibiting with respect to the second person, and the predicting includes predicting, as the future behavior of the person, a criminal act of the first person exhibiting with respect to the second person.

* * * * *